United States Patent

Shiroto et al.

[11] Patent Number: 5,812,232
[45] Date of Patent: Sep. 22, 1998

[54] OPTICAL SWITCHING DEVICE WITH HARD SPACERS EXHIBITING THERMOPLASTIC PROPERTY AT A TEMPERATURE NOT HIGHER THAN 150° C. AND FABRICATION PROCESS

[75] Inventors: Hironori Shiroto; Akihiro Mochizuki; Shigeo Kasahara; Tetsuya Makino; Tohru Itoh, all of Kanagawa; Masashi Watanabe, Okayama; Toshiaki Yoshihara, Kanagawa, all of Japan

[73] Assignee: Fujitsu Limited, Kawasaki, Japan

[21] Appl. No.: 628,315

[22] Filed: Apr. 5, 1996

[30] Foreign Application Priority Data

Apr. 12, 1995 [JP] Japan ................................ 7-086587

[51] Int. Cl.$^6$ ................................ G02F 1/1339
[52] U.S. Cl. ..................... 349/157; 349/155; 349/153
[58] Field of Search ................................ 349/157, 155, 349/153

[56] References Cited

U.S. PATENT DOCUMENTS

| 4,966,442 | 10/1990 | Ono et al. | 349/157 |
| 4,973,138 | 11/1990 | Yamazaki et al. | 349/157 |
| 4,989,955 | 2/1991 | Ito et al. | 349/157 |
| 5,054,890 | 10/1991 | Hanyu et al. | 349/155 |
| 5,087,114 | 2/1992 | Fului et al. | 349/157 |
| 5,130,831 | 7/1992 | Kohara et al. | 349/153 |
| 5,381,255 | 1/1995 | Ohnuma et al. | 349/157 |
| 5,541,452 | 7/1996 | Onoda | 257/723 |

FOREIGN PATENT DOCUMENTS

| 58-100122 | 6/1983 | Japan . |
| 59-201022 | 11/1984 | Japan . |
| 59-218425 | 12/1984 | Japan . |
| 61-002129 | 1/1986 | Japan . |
| 61-045223 | 3/1986 | Japan . |
| 61-073131 | 4/1986 | Japan . |
| 62-073232 | 4/1987 | Japan . |
| 62-161126 | 7/1987 | Japan . |
| 62-296122 | 12/1987 | Japan . |

OTHER PUBLICATIONS

"4th Polymer Material Forum" Study of tenacious LCD panel using thermosetting resin Hironori Shiroto, et al.

"Conference record of the 21st Japanese Liquid Crystal Conference in Sendai" A Tenacious Panel Structure for Practical Portable use LCDs Hironori Shiroto et al.

"Asia Display '95" A Tenacious Panel Structure for Practical Portable use LCDs Hironori Shiroto et al. pp1–4.

*Primary Examiner*—Anita Pellman Gross
*Assistant Examiner*—Tarifur R. Chowdhury
*Attorney, Agent, or Firm*—Greer, Burns & Crain, Ltd.

[57] ABSTRACT

An optical switching device of the present invention includes at least two substrates disposed facing opposite to each other. By scattering hard spacers which are thermally undeformable and soft spacers which are larger in size than the hard spacers and adapted to deform and then to cure by heat to adhere to the substrates, the spacing defined between the substrates is kept constant by diameters of the hard spacers. A medium having an optical switching function is retained in a gap defined between the substrates. The periphery of the gap between the substrates is sealed with a sealer. The sealer is made of a thermosetting resin having a thermosetting point equal to or higher than the thermosetting point of the soft spacers.

34 Claims, 24 Drawing Sheets

FIG. 3B     EXTERNAL PRESSURE

FIG. 9

| | | |
|---|---|---|
| X<br>1.51 | X<br>1.55 | X<br>1.52 |
| X<br>1.50 | X<br>1.54 | X<br>1.50 |
| X<br>1.49 | X<br>1.51 | X<br>1.50 |
| X<br>1.48 | X<br>1.50 | X<br>1.51 |
| X<br>1.45 | X<br>1.50 | X<br>1.48 |

OPTICAL SWITCHING DEVICE WITH HARD SPACERS EXHIBITING THERMOPLASTIC PROPERTY AT A TEMPERATURE NOT HIGHER THAN 150° C. AND FABRICATION PROCESS

BACKGROUND OF THE INVENTION

1. Field of the Invention

The present invention relates to an optical switching device comprising at least two substrates uniformly and constantly spaced apart from each other and having at least one transparent electrode; and a medium having an optical switching function and held between the substrates. T he invention further relates to a process for fabricating an optical switching device, which facilitates the filling of a liquid crystal to reduce the production cost and improve the throughput and yield.

2. Description of Related Art optical switching devices (liquid-crystal switching device, liquid-crystal display device, liquid-crystal light modulation device and the like) typically includes a pair of transparent substrates each having a transparent electrode and a medium with an optical switching function (e.g., liquid crystal) filled between the pair of transparent substrates. Such optical switching devices have been widely used as display devices for electronic calculators, domestic electrical appliances, OA systems and the like and as spatial light modulators, because they are generally thin and lightweight, and low in power consumption.

An optical switching device of another type has been proposed which includes three or more transparent substrates spaced apart from each other and media with the same or different optical switching functions (liquid crystal or the like) filled in two or more gaps defined between the respective transparent substrates to provide an optical AND function and/or an OR function.

When an optical switching device, for example, a liquid-crystal display device is fabricated, a sealing material containing spacers dispersed therein is applied on a peripheral portion of a substrate by way of screen printing or the like to uniformly control a spacing between electrodes formed on the respective substrates.

As recent liquid-crystal display devices have a larger display area and require higher quality, it is essential to uniformly control the spacing between the electrodes across the entire surfaces of the substrates. Where such a liquid-crystal display device is fabricated in accordance with the aforesaid method, the spacing between the electrodes around the central portion of the substrates tends to be reduced by an external pressure, resulting in an interference ring, and variation in color tone and driving voltage characteristics. In the worst case, the upper and lower substrates are brought in contact with each other by an external force, damaging orientation films formed thereon. This disturbs the alignment of liquid-crystal molecules, thereby lowering the display quality of the liquid-crystal display device.

FIG. 1 is a schematic diagram for explaining a conventional liquid-crystal display device. In FIG. 1, there are shown transparent substrates 1 and 2 each having a transparent electrode, spacers 3, a substrate sealing member 4, a liquid-crystal introduction opening 5, and a liquid crystal 6.

To fabricate the conventional liquid-crystal display device, the spacers 3 of inorganic particles such as chopped glass fibers, spherical silicate glass particles or alumina powder or spherical hard particles of a synthetic organic resin such as a cross-linked polystyrene resin, a cross-linked divinylbenzene resin or an amino resin are scattered over the entire surface of the transparent substrate 2 on a side thereof formed with the electrode. Then, the transparent substrate 1 having the transparent electrode is positioned on the transparent substrate 2 so that the transparent electrodes formed on the respective substrates 1 and 2 face opposite to each other across the spacers 3, whereby the spacing between the electrodes is uniformly controlled by the spacers 3. The periphery of the combined substrates 1 and 2 are sealed with the substrate sealing member 4 with the liquid-crystal introduction opening 5 left unsealed. In turn, the liquid crystal 6 is introduced from the liquid-crystal introduction opening 5, and the liquid-crystal introduction opening 5 is finally sealed. See Japanese Unexamined Patent Publications No. 58-100122 (1983) and No. 59-201022 (1984).

The substrate sealing member 4 may contain spacers of the same type as the aforesaid spacers 3.

In this case, however, it is impossible to prepare spacers having exactly the same particle sizes or diameters.

FIG. 2 is a diagram for explaining one exemplary particle size distribution of the spacers. As shown, the spacers have a particle size distribution pattern of 6.0 $\mu$m+0.1 $\mu$m.

FIGS. 3A and 3B are diagrams for explaining a warped state of substrates of the conventional liquid-crystal display device. FIG. 3A shows a state where no external pressure is applied, and FIG. 3B shows a state where an external pressure is applied.

In FIGS. 3A and 3B, there are shown glass substrates 11 and 12, larger spacers 13 and smaller spacers 14.

Where no external pressure is applied to the liquid-crystal display device (see FIG. 3A), the two glass substrates 11 and 12 are supported by the larger spacers 13 which account for only 3% of the total number of the larger and smaller spacers, and the smaller spacers 14 contact either one of the glass substrates 11 and 12.

Where an external pressure is applied to the two glass substrates of the liquid-crystal display device (see FIG. 3B), the glass substrates 11 and 12 are warped to come into contact with some of the smaller spacers 14 while being supported by the larger spacers 13. Therefore, the spacing between the warped portions of the glass substrates 11 and 12 (or electrodes) is decreased.

When chopped glass fibers, spherical silicate glass particles, or cylindrical or spherical inorganic particles such as of alumina having a small expansion coefficient are used as the spacers, the linear expansion coefficient thereof is significantly different from that of the liquid crystal and, therefore, bubbles are generated in the liquid crystal at a relatively low temperature. The liquid crystal is expelled from the bubbled areas, whereby the bubbled areas of the liquid-crystal display device no longer properly function. Even if the temperature thereafter rises, the bubbles do not disappear, making it impossible to recover the function of the liquid-crystal display device. Therefore, the temperature range for the use of the liquid-crystal display device is limited.

Further, if the spacers are nonuniformly dispersed in the liquid-crystal display device having the aforesaid construction, the spacing between the electrodes cannot be kept uniform, resulting in nonuniformity in the display characteristics and color tone of the liquid-crystal display device.

Particularly, in the case of a super-twisted nematic (STN) liquid-crystal display device which has recently been in a great demand, the spacing between electrodes thereof should be kept uniform with high precision. Therefore, spacers should have highly uniform diameters.

Conventional methods for scattering the spacers between transparent substrates of the liquid-crystal display device are as follows:

(1) A dry scattering method in which the spacers are scattered by using air or nitrogen gas; and (2) A wet scattering method in which the spacers are scattered by spraying the spacers dispersed in a volatile solvent such as $CCl_3F$ or alcohol from a spray nozzle.

Conventional methods for keeping the spacing between the entire surfaces of the electrodes uniform even when an external pressure is applied to the transparent substrates are as follows:

(1) Spacers exhibiting no particle size distribution (spacers having exactly the same particle diameters) are used;

(2) Where spacers exhibiting wide particle size distribution are used, the scattering density thereof is increased to prevent the substrates from being warped; and (3) Where the scattering density of the spacers is substantially the same as in the prior art, the number of spacers that actually support the upper and lower substrates is increased.

According to the method (1), it is extremely difficult to produce spacers having uniform diameters, as described above. According to the method (2), the mechanical strength of the substrates can be effectively enhanced. However, the increased scattering density leads to deterioration of display quality such as disturbance of the alignment of liquid crystal molecules, a reduced contrast ratio due to a reduced opening ratio and a reduced transmittance.

In the method (3), glass spacers of a low melting-point may be used in combination with conventionally used heatresistant spacers.

According to this method, the low-melting-point inorganic glass hardly affects the alignment of liquid crystal molecules because the dielectric constant thereof is significantly different from that of the liquid crystal. In addition, the glass can be imparted with a sufficient resistance to a mechanical shock. However, when the glass spacers are subjected to a heat-treatment at a high temperature of 100° C. to 130° C. during a process for adhesion shortage of an organic polymer orientation film such as of polyimide, or for sealing the substrates or other processes, the low-meltingpoint glass spacers supporting the substrates are re-melted and spread around, so that the spacing between the electrodes cannot be kept at a predetermined value.

In the case of the ferroelectric liquid-crystal display device, the spacing between the electrodes should be uniformly adjusted to less than 1 $\mu$m to 2 $\mu$m. Where low-melting-point glass spacers having diameters of 5 $\mu$m to 10 $\mu$m are scattered between the substrates, it is difficult to squash the glass spacers to a thickness of 1 $\mu$m to 2 $\mu$m which is equivalent to the required inter-electrode spacing, by heating the glass spacers up to a temperature higher than the melting point thereof.

To overcome this problem, the combinational use of spacing controlling members (spacers) of two different types (i.e., thermally-undeformable spacers, and thermosetting resin spacers such as of epoxy resin which are melted or softened by heat to deform and then to cure to adhere to the substrates) is now under consideration for practical application.

In general, a spacer scattering process follows a process for rubbing orientation films of an organic polymer with a nylon or rayon fabric. If the thermosetting resin spacers to be used have a thermosetting point of higher than 150° C., the rubbing effect of the orientation films may be lost due to the heat.

On the contrary, it is desirable that the thermosetting resin spacers have a glass transition point of higher than 100° C. to withstand an annealing process for re-alignment of liquid crystal molecules.

Further, where the wet scattering method is used to scatter the thermosetting resin spacers on the substrate, the thermosetting resin spacers may be further polymerized or swell in a solvent to cause the clogging of the spray nozzle, or unreacted components in the thermosetting resin spacers may leach into the solvent to disturb the alignment of the liquid crystal molecules.

Since the thermally-undeformable spacers are not firmly bonded to the substrates, some of the thermally-undeformable spacers are moved when the liquid crystal is filled between the substrates during the fabrication process of the liquid-crystal display device or when an external pressure is applied onto the substrates. This results in cohesion or defect of the spacers, making it difficult to keep the spacing between the electrodes uniform. In addition, the orientation films are damaged to disturb the alignment of the liquid crystal molecules, thereby degrading the display quality of the liquid-crystal display device.

To overcome these problems, various approaches are proposed. For example, Japanese Unexamined Patent Publication No. 62-161126 (1987) proposes a method for fixing spacers by applying a solution of an orientation film material containing the spacers dispersed therein on a substrate. Japanese Unexamined Patent Publications No. 61-45223 (1986) and No. 61-2129 (1986) propose methods for fixing spacers by scattering the spacers on an uncured orientation film which is thereafter cured. Japanese Unexamined Patent Publication No. 61-73131 (1986) proposes a method for fixing spacers by scattering the spacers on a substrate and then forming an orientation film by way of transfer printing.

According to the aforesaid spacer-scattering and fixing methods for a liquid-crystal display device, however, it is difficult to apply the solution of the orientation film material on the substrate in a state where the spacers are uniformly scattered on the substrate at a high scattering density. Further, some of the spacers once fixed on the substrate may fall off during the rubbing treatment for the orientation film. Therefore, it is difficult to fix the spacers on the substrate of the liquid-crystal display device to ensure a satisfactory display quality of the liquid-crystal display device.

SUMMARY OF THE INVENTION

It is therefore an object of the present invention to provide an optical switching device in which spacers located between orientation films respectively formed on substrates having transparent electrodes can be kept unmovable to firmly adhere the substrates even during a heating and squashing process which follows a spacer scattering process, so that the spacing between the electrodes within a display area thereof is kept uniform and constant.

It is another object of the present invention to provide a process for fabricating an optical switching device which facilitates the filling of a liquid crystal in the optical switching device to improve the throughput and yield of the device and to reduce the production cost.

In accordance with a first aspect of the present invention, there is provided an optical switching device comprising: at least two substrates disposed facing opposite to each other; hard spacers which are thermally undeformable; soft spacers which are larger in size than the hard spacers and adapted to deform and then to cure by heat to adhere to the substrates; the hard spacers and the soft spacers being disposed between the substrates in such a manner that a spacing between the substrates is kept constant by diameters of the hard spacers; a medium with an optical switching function filled in a gap defined between the substrates; and a sealer which seals the periphery of the substrates; wherein the sealer is made of a thermosetting resin having a thermosetting point equal to or higher than a thermosetting point of the soft spacers.

In accordance with a second aspect of the present invention, there is provided an optical switching device comprising: at least two substrates disposed facing opposite to each other and each having an orientation film subjected to a rubbing treatment; hard spacers which are thermally-undeformable; soft spacers which are adapted to deform and then to be cured by heat to adhere to the substrates; the soft spacers and the hard spacers being disposed between the substrates in such a manner that a spacing between the substrates is kept constant by diameters of the hard spacers; a liquid crystal serving as a medium with an optical switching function and is retained in a gap defined between the substrates; and a sealer which seals the periphery of the substrates; wherein the soft spacers have a thermosetting point that does not adversely affect a liquid-crystal aligning function of the orientation film.

In accordance with a third aspect of the present invention, there is provided a process for fabricating an optical switching device, comprising the steps of: scattering, on at least one of a pair of substrates for forming a liquid crystal space, hard spacers which are thermally-undeformable and soft spacers which are larger in size than the hard spacers and adapted to deform and then to cure by heat to adhere to the substrates; heating and pressing the pair of substrates in an opposing relation to combine the substrates into a body adhered by the soft spacers and with a spacing therebetween kept constant by the hard spacers; and filling a liquid crystal between the substrates from any peripheral sides of the combined substrates.

The foregoing and other objects, features and attendant advantages of the present invention will become more readily apparent from the following detailed description of the preferred embodiments. However, it should be understood that the preferred embodiments are only illustrative of the invention, since various changes and modifications can be made within the spirit and scope of the invention as would be apparent to those skilled in the art.

BRIEF DESCRIPTION OF THE DRAWINGS

The present invention will be detailed in conjunction with the accompanying drawings, but the invention is not limited thereto.

FIGS. 3A and 3B are diagrams for explaining a warped state of substrates of the conventional liquid-crystal display device, and illustrate a state where no external pressure is applied thereto and a state where an external pressure is applied thereto, respectively;

FIGS. 9 to 11 are inter-electrode spacing distribution patterns of liquid-crystal light modulation devices in accordance with Examples 4 to 6, respectively, of the present invention;

DESCRIPTION OF THE PREFERRED EMBODIMENTS

Figure 1:
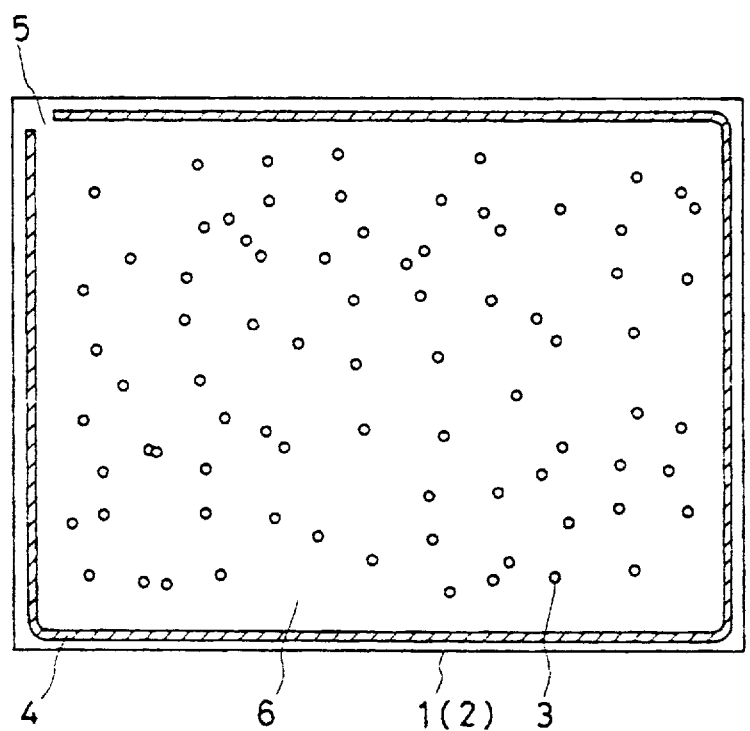
FIG. 1 is a schematic diagram illustrating the construction of a conventional liquid-crystal display device.
Figure 2:
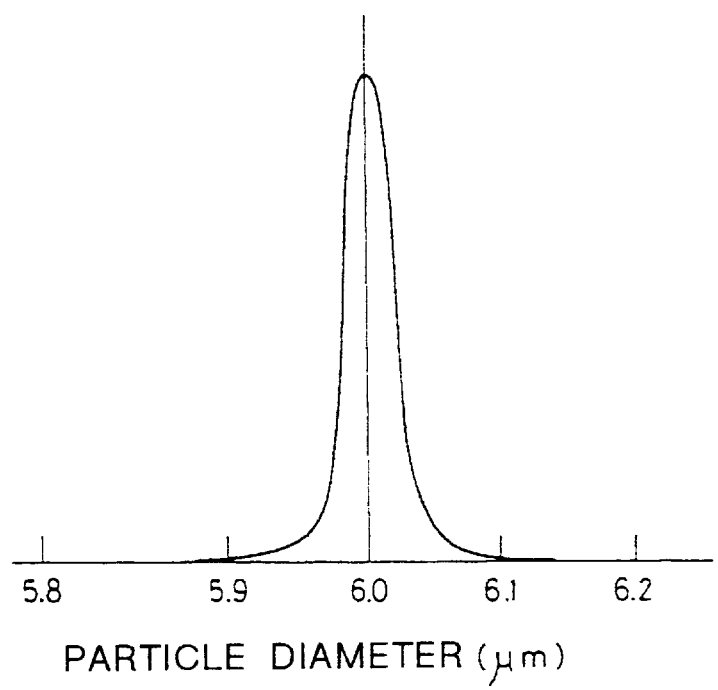
FIG. 2 is a diagram for explaining one exemplary particle size distribution of spacers.
Figure 3A:
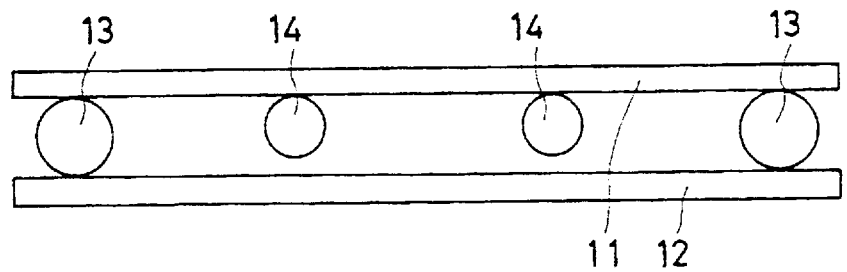
Figure 3A:
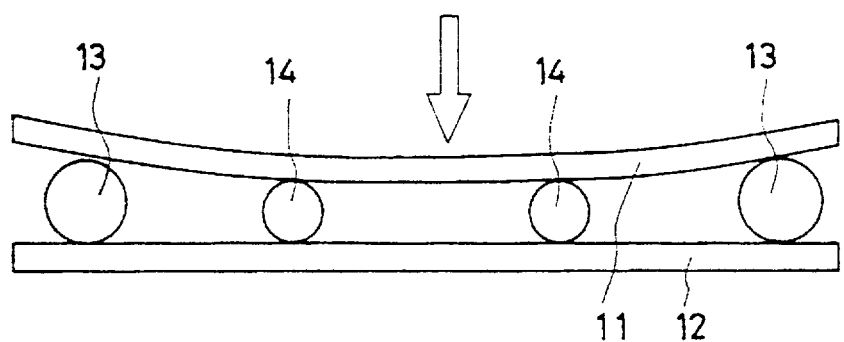

In the present invention, usable as the substrates are glass substrates of various types and plastic substrates of various types having substantially the same property as glass, which are commonly used for liquid-crystal display devices, electroluminescent (EL) display devices and plasma display devices.

Usable as the hard spacers are particles of an organic synthetic resin and an inorganic substance.

Examples of the organic synthetic resins to be used for the hard spacers include cross-linked copolymers comprising polystyrene resins, amino resins and divinylbenzene. These may be used either alone or in combination.

Examples of the inorganic particles to be used as the hard spacers include chopped glass fibers, silicate glass particles and alumina powder. These may be used either alone or in combination.

More specific example of the hard spacers is transparent spherical hard plastic particles of a cross-linked copolymer comprising divinylbenzene as a principal component, which are available from Sekisui Fine Chemical Inc. under the registered trademark of MICROPEARL SPN.

The hard spacers are preferably coated with a thermoplastic resin exhibiting its thermoplastic property at a temperature not higher than 150° C. Examples of specific thermoplastic resins to be used for the coating of the hard spacers include polyvinyl chloride resins, polyvinylidene chloride resins, polyvinyl acetate resins, polymethacryl resins, polystyrene resins, polyamide resins, polyethylene resins, polypropylene resins, fluorine-containing resins, polyacrylonitrile resins, polyvinyl ether resins, polyvinyl ketone resins, polyether resins, polycarbonate resins, polyvinyl pyrrolidone resins and saturated polyester resins. These thermoplastic resins may be used either alone or in combination.

The soft spacers are preferably formed of a thermosetting resin. Examples of specific thermosetting resins include phenol resins, urea resins, melamine resins, alkyed polyester resins, unsaturated polyester resins, polyurethane resins, epoxy resins, furan resins, xylene resins, ketone resins, aniline resins, sulfonamide resins, diarylphthalate resins, silicone resins and resorcin resins. These thermosetting resins may be used either alone or in combination.

The soft spacers are preferably scattered uniformly on one of the substrates by a dry scattering method.

The soft spacers preferably have an average diameter less than three times the average diameter of the hard spacers.

The soft spacers are preferably scattered on the substrate at a scattering density of 50 to 200/mm$^2$, and the hard spacers are preferably scattered on the substrate at a scattering density of 5 to 20/mm$^2$.

The hard spacers, the soft spacers and the sealer preferably each have a linear expansion coefficient of $10^{-4}$ to $10^{-6}$/°C.

The sealer and the soft spacers are preferably made of a material comprising at least one thermosetting resin having a thermosetting time of not longer than two hours at a thermosetting point of 100° C. to 160° C.

Examples of specific thermosetting resins to be used for the sealer include those to be used for the soft spacers.

The soft spacers are preferably formed of an epoxy resin having a thermosetting time of about one hour at a thermosetting point of about 110° C., and the sealer is preferably made of an epoxy resin having a thermosetting time of about one hour at a thermosetting point of about 150° C.

Alternatively, the soft spacers may be formed of a phenol resin having a thermosetting time of about one hour at a thermosetting point of about 120° C., the sealer may be made of an epoxy resin having a thermosetting time of about one hour at a thermosetting point of about 140° C.

The substrates are preferably heated stepwise at the thermosetting point of the soft spacers and at the thermosetting point of the sealer.

The medium retained in the gap defined between the substrates may be a liquid crystal. Examples of the liquid crystal include a twisted nematic liquid crystal, a supertwisted nematic liquid crystal, a nematic-cholesteric phase transition liquid crystal, a polymer dispersion liquid crystal, a ferroelectric liquid crystal, an antiferroelectric liquid crystal, a twist grain boundary liquid crystal and a smectic A phase liquid crystal exhibiting an electroclinic effect.

The sealing of the periphery of the gap defined between the substrates is preferably carried out in two steps in which the periphery of the gap is sealed with the sealer with at least one side thereof left unsealed before the filling of the medium having the optical switching function, and the unsealed side is sealed after the filling of the medium.

The optical switching device can be applied to a plasma display device, an electrochromic display device and a field-emission-array display device.

Where the substrates each have an orientation film subjected to a rubbing treatment, the soft spacers preferably have a thermosetting point which does not adversely affect a liquid-crystal aligning function of the orientation film, and the sealer preferably has a thermosetting point which is equal to or higher than the thermosetting point of the soft spacers and does not adversely affect the liquid-crystal aligning function of the orientation film.

More specifically, usable for the sealer are an epoxy thermosetting resin available from Mitsui Toatsu Chemicals Inc. under the registered Trademark of STRUCTBOND XN-5A-C-F or Yoshikawa Chemical Co., Ltd. under the registered trademark of SE-4500 and an epoxy thermosetting resin available from Epoxy Technology Inc. under the registered trademark of XB/9021.

In accordance with the present invention, the process for fabricating an optical switching device comprises the steps of: scattering, on at least one of a pair of substrates for forming a liquid crystal space, hard spacers which are thermally-undeformable and soft spacers which are larger in size than the hard spacers and adapted to deform and then to cure by heat to adhere to the substrates; heating and pressing the pair of substrates in an opposing relation to combine the substrates into a body adhered by the soft spacers and with a spacing therebetween kept constant by the hard spacers; and filling a liquid crystal between the substrates from any peripheral sides of the combined substrates.

Examples of the liquid crystal to be filled between the substrates include a twisted nematic liquid crystal, a supertwisted nematic liquid crystal, a nematic-cholesteric phase transition liquid crystal, a polymer dispersion liquid crystal, a ferroelectric liquid crystal, an antiferroelectric liquid crystal, a twist grain boundary liquid crystal and a smectic A phase liquid crystal exhibiting an electroclinic effect.

The filling of the liquid crystal between the substrates is preferably achieved by utilizing either or both of a pressure difference and a temperature difference between the inside and outside of the combined substrates.

The periphery of the combined substrates is preferably sealed with a sealer with a peripheral side of the combined substrates left unsealed for provision of a liquid-crystal introduction opening before the filling of the liquid crystal, and the unsealed side is sealed with the sealer after the filling of the liquid crystal.

The sealer is preferably made of a thermosetting resin having a thermosetting point equal to or higher than a thermosetting point of the soft spacers.

The liquid-crystal introduction opening may be formed on two opposing peripheral sides of the combined substrates.

The substrates are preferably temporarily fixed together by providing either or both of line-shaped and dot-shaped temporal fixing members on part of a peripheral portion of one of the substrates or on the entire peripheral portion of one of the substrates except the liquid-crystal introduction opening before the heating and squashing of the substrates.

The temporal fixing members preferably also serve as the sealer.

The temporal fixing member may be formed of the same thermosetting resin as used for the sealer, but the thermosetting resin preferably exhibits adhesiveness (wettability) to the substrates.

In the following, the present invention will be described in detail by way of embodiments that are illustrated by the drawings. But it is to be noted that the invention is in no way limited to those embodiments.

Figure 4A:
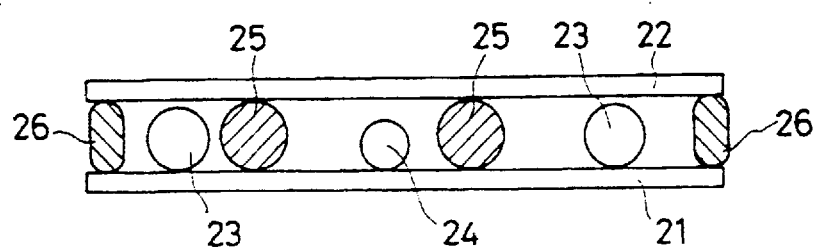
FIGS. 4A to 4C are schematic diagrams for explaining respective steps of a fabrication process for an optical switching device in accordance with the present invention.
Figure 4B:
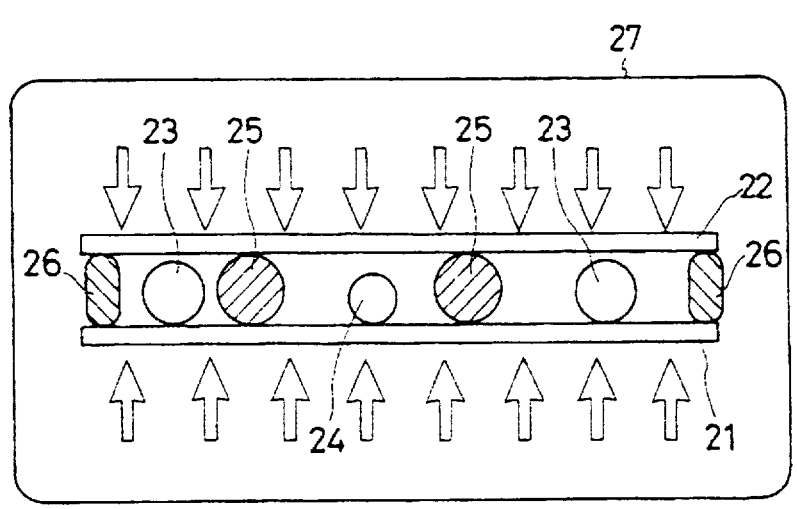
Figure 4C:
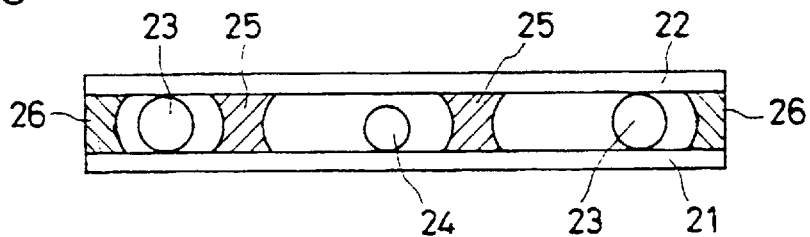

FIGS. 4A to 4C are schematic diagrams for explaining respective steps of a process for fabricating an optical switching device in accordance with the present invention. In FIGS. 4A to 4C, there are shown glass substrates 21 and 22, larger hard spacers 23 coated with a thermoplastic resin, smaller hard spacers 24 coated with the thermoplastic resin, soft spacers 25 made of a thermosetting resin, a bond-sealing member 26 and a heat-treatment apparatus 27.

A general fabrication process for an optical switching device will first be outlined with reference to FIGS. 4A to 4C.

The following explanation focuses on steps for sealing a gap defined between electrodes of the optical switching device while keeping a spacing between the electrodes uniform and constant. Materials and the like of the respective components of the optical switching device will be collectively described later.

First step (see FIG. 4A)

The larger and smaller hard spacers 23 and 24 coated with the thermoplastic resin are scattered on the glass substrate 21 having a transparent electrode and an orientation film formed thereon, and then the thermosetting resin soft spacers 25 which are larger in diameter than the larger and smaller hard spacers 23 and 24 are scattered on the glass substrate 21. In turn, the bond-sealing member 26 is formed on a peripheral portion of the glass substrate 22, and the glass substrate 22 having an electrode and an orientation film formed thereon is placed on the glass substrate 21.

It should be noted that the bond-sealing member 26 is formed with a liquid-crystal introduction opening not shown. Further, it should be noted that the thermosetting resin soft spacers 25 are first electrostatically charged through charge electrodes to be separated from each other by an electrostatic repelling force and then scattered on the glass substrate 21.

Second step (see FIG. 4B)

An assembly comprising the glass substrates 21 and 22, the bond-sealing member 26, the larger and smaller hard spacers 23 and 24 and the thermosetting resin soft spacers 25 is put in the heat-treatment apparatus 27, and pressed from the upper and lower sides thereof at a thermosetting point of the thermosetting resin soft spacers (110° C. to 150° C.).

In this step, the larger hard spacers 23 are bonded to the glass substrates 21 and 22 with the thermoplastic resin coating of the larger hard spacers 23 to uniformly keep the spacing between the glass substrates 21 and 22 at a desired value. The smaller hard spacers 24 are bonded to either one of the glass substrates 21 and 22 with the thermoplastic resin coating of the smaller hard spacers 24 and, therefore, the smaller hard spacers 24 are prevented from moving. The thermosetting resin soft spacers 25 are firmly bond to the glass substrates 21 and 22. Further, the periphery of the gap defined between the glass substrates 21 and 22 is sealed with the bond-sealing member 26.

Third step (see FIG. 4C)

The liquid crystal is filled in the gap defined between the glass substrates 21 and 22 from the liquid-crystal introduction opening, which is thereafter sealed.

In the second step, the thermoplastic resin coating of the larger and smaller hard spacers 23 and 24, the thermosetting resin soft spacers 25 and the bond-sealing member 26 are melted at the same time in the first heat treatment, and the thermosetting resin soft spacers 25 are then cured in the second heat treatment. Therefore, the glass substrates 21 and 22 can be fixed together with the spacing therebetween within a display area of the device being kept at a predetermined value. Thereafter, the temperature is further raised and the bond-sealing member 26 is cured to seal the glass substrates 21 and 22 in the third heat treatment.

If the curing of the bond-sealing member 26 precedes the curing of the thermosetting resin soft spacers, the soft spacers 25 cannot be squashed to a thickness equivalent to the diameter of the larger hard spacers 23 by applying a pressure to the glass substrates from the upper and lower sides thereof by pressure means.

The maximum temperature at which the bond-sealing member 26 or the thermosetting resin soft spacers 25 are melted and cured should be maintained within a temperature range which does not adversely affect the liquid-crystal aligning function (or a rubbing effect) of the orientation films formed on the glass substrates 21 and 22. More specifically, the temperature should be kept below the glass transition temperature of the orientation films.

On the basis of the above-mentioned general fabrication process for an optical switching device, the best mode of the optical switching device and the fabrication process therefor will be described below.

A 1.0 wt % polyimide solution was applied on a pair of 200 mm×100mm×1.1 t, mm glass substrates each having a combshaped transparent electrode formed on the entire surface thereof by means of a spin coater at a rotational speed of 2,000 rpm. Then, the glass substrates were heat-treated at 200° C. for 30 minutes. For the formation of orientation films, the glass substrates were respectively rubbed in two different directions such that the twist angle between the orientation films was anti-parallel.

On the entire surface of one of the glass substrates, spherical silicate glass hard spacers having a linear expansion coefficient of $0.4 \times 10^{-6}$/°C. and an average diameter of 1.6 µm were uniformly scattered at a scattering density of about 100/mm$^2$, and then epoxy rein soft spacers having diameters of 4.0 µm to 6.0 µm and a linear expansion coefficient of $4.4 \times 10^{-5}$/°C. and adapted to cure at 120° C. in one hour were uniformly scattered at a scattering density of about 1,000/mm$^2$ by a wet scattering method.

In turn, a periphery sealing member of an epoxy resin (STRUCTBOND XN-5A-C-F available from Mitsui Toatsu Chemicals Inc.) having a linear expansion coefficient of $6.8 \times 10^{-5}$/°C. and adapted to cure at 130° C. in one hour was formed on a peripheral portion of the other glass substrate except a liquid-crystal introduction opening by way of a printing method. Then, the glass substrates were combined in such a manner that the transparent electrodes formed thereon faced opposite to each other.

The combined glass substrates were put in a vacuum bag and heated at 110° C. for one hour to melt the epoxy resin soft spacers and the epoxy resin periphery sealing member, and pressed from the upper and lower sides thereof so that the epoxy resin soft spacers and the epoxy resin periphery sealing member were squashed to a thickness equivalent to the average diameter of the silicate glass hard spacers. The combined glass substrates were further heated at 150° C. for one and half hours to cure the epoxy resin soft spacers and the epoxy resin periphery sealing member. At this temperature, the epoxy resin soft spacers cured before the epoxy resin periphery sealing member cured.

A ferroelectric liquid crystal mixture containing naphthalene base material was filled in a gap defined between the pair of glass substrates, and then the liquid-crystal introduction opening was sealed. Finally, polarizer plates were respectively bonded to upper and lower sides of the combined glass substrates. Thus, a ferroelectric liquid-crystal display device was completed.

The present invention will hereinafter be described in detail by way of Examples 1 to 13 illustrated in the attached drawings. However, it should be noted that the invention is in no way limited to these Examples.

EXAMPLE 1

On the basis of the aforesaid general fabrication process for an optical switching device, an optical switching device and fabrication process therefor according to Example 1 will be described in detail.

A 3 wt % polyimide solution was applied on 200 mm×100 mm×1.1 t, mm glass substrates each having a transparent electro formed on the entire surface thereof by means of a spin coater at a rotational speed of 2,000 rpm. Then, the glass substrates were heat-treated at 250° C. for 30 minutes. For the formation of liquid-crystal orientation films, the glass substrates were respectively rubbed in two different directions such that the twist angle between the orientation films was 260°.

Used as hard spacers were chopped glass fibers having a linear expansion coefficient of $5.4 \times 10^{-6}/°C$. and an average diameter of 6.0 $\mu$m and coated with a polyvinyl chloride resin exhibiting its thermoplastic property at 80° C. or higher. Soft spacers had diameters of 8.0 $\mu$m to 10.0 $\mu$m and were formed of a phenol resin having a linear expansion coefficient of $8.1 \times 10^{-4}/°C$. and adapted to cure at 120° C. in one hour. On the entire surface of one of the glass substrates, the hard spacers were uniformly scattered at a scattering density of about $10/mm^2$, and the soft spacers were uniformly scattered at a scattering density of about $100/mm^2$ by a dry scattering method. In turn, a bond-sealing member of an epoxy resin having a linear expansion coefficient of $3.7 \times 10^{-5}/°C$. and adapted to cure at 140° C. in one hour was formed on a peripheral portion of the other glass substrate except a liquid-crystal introduction opening by way of a printing method.

The glass substrates were combined in such a manner that the transparent electrodes formed thereon faced opposite to each other. The combined glass substrates were put in a vacuum bag and heated at 80° C. for ten minutes to melt the polyvinyl chloride resin coating of the hard spacers and, at the same time, the phenol resin soft spacers and the periphery sealing member were melted and squashed to a thickness equivalent to the average diameter of the chopped glass fibers. After the phenol resin soft spacers were cured at 120° C. in one hour, the epoxy resin sealing member was cured at 140° C. in one hour.

A super-twisted nematic liquid crystal was introduced from the liquid-crystal introduction opening and filled between the pair of glass substrates spaced a predetermined distance apart from each other. Finally, the liquid-crystal introduction opening was sealed. Thus, an STN liquid-crystal display device was fabricated.

The liquid-crystal display device was placed under Crossed-Nicols (polarlizer), and a compressive load of 100 g was applied onto the central portion of the liquid-crystal display device with a pen having a hemispherical tip of radius of 0.8 mmR. At this time, no change in displayed color was observed around the compressed portion of the display device. The liquid-crystal display device exhibited a stress resistance to an external force exerted to reduce the thickness of a liquid-crystal layer.

Further, a load of 300 g was applied to opposite end portions of the liquid-crystal display device with the central portion thereof supported. At this time, no change in displayed color was observed in the entire display area of the display device, and no change was observed in the thickness of the entire liquid-crystal layer.

Comparative Example 1

For comparison with the liquid-crystal display device of Example 1, a liquid-crystal display device was fabricated in substantially the same manner as in Example 1, except that a sealing member and spacers commonly used in a conventional liquid-crystal display device were employed.

A 3 wt % polyimide solution was applied on a pair of 200 mm×100 mm×1.1 t, mm glass substrates each having a transparent electrode formed on the entire surface thereof by means of a spin coater at a rotational speed of 2,000 rpm. Then, the glass substrates were heat-treated at 250° C. for 30 minutes. For the formation of liquid-crystal orientation films, the glass substrates were respectively rubbed in two different directions such that the twist angle between the orientation films was 260°.

Chopped glass fibers having a linear expansion coefficient of $2.3 \times 10^{-7}/°C$. and an average diameter of 6.0 $\mu$m were uniformly scattered on one of the glass substrates at a scattering density of about $150/mm^2$. Then, the glass substrates were combined in such a manner that the transparent electrodes formed thereon faced opposite to each other. In turn, a super-twisted nematic liquid crystal was introduced from a liquid-crystal introduction opening formed in the bondsealing member, and filled between the glass substrates. Thus, an STN liquid-crystal display device was fabricated.

The liquid-crystal display device was placed under Crossed-Nicols, and a compressive load of 100 g was applied onto the central portion of the liquid-crystal display device with a pen having a hemispherical tip of radius of 0.8 mmR. At this time, a coloration was observed around the compressed portion of the display device. The liquid-crystal display device did not exhibit a stress resistance to an external force exerted to reduce the thickness of a liquid-crystal layer.

Further, a load of 100 g was applied to opposite end portions of the liquid-crystal display device with the central portion thereof supported. At this time, a coloration was observed in the entire display area of the display device.

EXAMPLE 2

On the basis of the aforesaid general fabrication process for an optical switching device, an optical switching device and fabrication method therefor according to Example 2 will be described.

A 3 wt % polyimide solution was applied on a pair of 200 mm×100 mm×1.1 t, mm glass substrates each having a transparent electrode formed on the entire surface thereof by means of a spin coater at a rotational speed of 2,000 rpm. Then, the glass substrates were heat-treated at 250° C. for 30 minutes. For the formation of orientation films, the glass substrates were respectively rubbed in two different directions such that the twist angle between the orientation films was antiparallel.

Used as hard spacers were spherical silicate glass particles having a linear expansion coefficient of $2.9 \times 10^{-6}/°C$. and an average diameter of 1.5 $\mu$m and coated with a polymethacryl resin exhibiting its thermoplastic property at 90° C. or higher. Soft spacers had diameters of 2.0 $\mu$m to 4.0 $\mu$m, and were formed of an epoxy resin having a linear expansion coefficient of $1.1 \times 10^{-5}/°C$. and adapted to cure at 130° C. in one hour. On the entire surface of one of the glass substrates, the hard spacers were uniformly scattered at a scattering density of about $10/mm^2$, and the soft spacers were uniformly scattered at a scattering density of about $100/mm^2$ by a dry scattering method. In turn, a bond-sealing member of an epoxy resin having a linear expansion coefficient of $3.7 \times 10^{-5}$/°C. and adapted to cure at 140° C. in one hour was formed on a peripheral portion of the other glass substrate except a liquid-crystal introduction opening by way of a printing method.

The glass substrates were combined in such a manner that the transparent electrodes formed thereon faced opposite to each other. The combined glass substrates were put in a vacuum bag and heated at 90° C. for ten minutes to melt the polymethacryl resin coating of the hard spacers and, at the same time, the epoxy resin soft spacers and the bond-sealing member were melted and squashed to a thickness equivalent to the diameter of the silicate glass hard spacers. After the epoxy resin soft spacers were cured at 130° C. in one hour, the epoxy resin sealing member was cured at 140° C. in one hour.

A ferroelectric liquid crystal mixture containing naphthalene base material was introduced from the liquid-crystal introduction opening formed in the bond-sealing member, and filled between the pair of glass substrates. Finally, the liquid-crystal introduction opening was sealed. Thus, a ferroelectric liquid-crystal display device was fabricated.

The liquid-crystal display device was placed under Crossed-Nicols, and a compressive load of 300 g was applied onto the central portion of the liquid-crystal display device with a pen having a hemispherical tip of radius of 0.8 mmR. At this time, no change in displayed color was observed around the compressed portion of the display device. The liquid-crystal display device exhibited a stress resistance to an external force exerted to reduce the thickness of a liquid-crystal layer.

Further, a load of 500 g was applied to opposite end portions of the liquid-crystal display device with the central portion thereof supported. At this time, no change in displayed color was observed in the entire display area of the display device, and no change was observed in the thickness of the entire liquid-crystal layer.

Comparative Example 2

For comparison with the liquid-crystal display device of Example 2, a liquid-crystal display device was fabricated in substantially the same manner as in Example 2, except that a sealing member and spacers commonly used in a conventional liquid-crystal display device were employed.

The fabricated liquid-crystal display device was placed under Crossed-Nicols, and a compressive load of 100 g was applied onto the central portion of the liquid-crystal display device with a pen having a hemispherical tip of radius of 0.8 mmR. At this time, a coloration was observed around the compressed portion of the display device. The liquid-crystal display device did not exhibit a stress resistance to an external force exerted to reduce the thickness of a liquid-crystal layer.

Further, a load of 100 g was applied to opposite end portions of the liquid-crystal display device with the central portion thereof supported. At this time, a coloration was observed in the entire display area of the display device.

The optical switching devices according to Examples 1 and 2 each employ the hard spacers which are thermally-undeformable and the soft spacers which are melted or softened by heat to deform and then to cure to adhere to the glass substrates, so that the spacing between the pair of glass substrates is kept constant by diameters of the hard spacers. Further, the optical switching devices each include the bondsealing member formed of a thermosetting resin having a thermosetting point equal to or higher than that of the soft spacers. The glass substrates are first bonded with the soft spacers with the spacing therebetween kept uniform and constant, and then the periphery of a gap defined between the glass substrates is sealed with the thermosetting resin sealing member, whereby deformation and distortion which may otherwise occur in the peripheral portions of the glass substrates can be prevented.

Where the optical switching device is a liquid-crystal display device, deterioration of the display quality of the device due to heat can be prevented by appropriately selecting a material for the soft spacers such that the thermosetting point thereof does not adversely affect the liquid-crystal aligning function of the orientation films formed on the glass substrates.

Where glass substrates are used as electrode substrates for a high-capacity display device or a large-scale display device to be installed in a dashboard of an automobile, one typical drawback in the prior art is the warpage of the substrates. The warpage of the substrates may be an intrinsic one, or may be caused when the substrates are joined with a sealer, or when the display device is subjected to heat or an external force to cause strain therein after the fabrication thereof. Where the electrode substrates are made of a flexible material, the electrode substrates are readily deformed by an external force during or after the fabrication of the display device, resulting in a nonuniform spacing between the substrates. However, the optical switching device of the present invention is free from the aforesaid drawback and stable over a long period of time, because the spacing between the substrates can be kept uniform and constant by the hard spacers and the soft spacers present within an effective display area thereof.

EXAMPLE 3

Since a liquid-crystal display device is constructed such that a liquid crystal is retained between two or more glass substrates spaced a minute distance apart from each other, how to efficiently introduce the liquid crystal into one or more gaps between the glass substrates is important.

Figure 5:
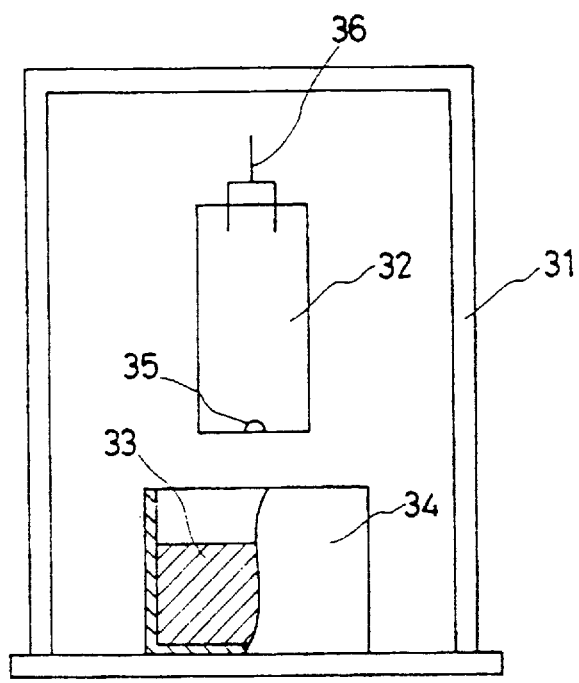
FIG. 5 is a diagram for explaining a liquid-crystal filling step in a fabrication process for the conventional liquid-crystal display device.

FIG. 5 is a diagram for explaining a liquid-crystal filling step of a conventional fabrication process for a liquid-crystal display device. In FIG. 5, there are shown a bell jar 31, a liquid-crystal panel 32, a liquid crystal 33, a liquid crystal pot 34, a liquid-crystal introduction opening 35 and a transportation mechanism 36.

In accordance with a prior art, the liquid crystal 33 is filled in the panel (liquid-crystal panel) 32 of the liquid-crystal display device in the following manner. The liquid-crystal pot 34 filled with the liquid crystal 33 is placed in the bell jar 31 which can be degassed under vacuum, and the panel 32 is suspended over the liquid-crystal pot 34 from the transportation mechanism 36. The panel 32 includes a pair of glass substrates each formed with a transparent electrode and an orientation film subjected to a rubbing treatment for alignment of liquid crystal molecules, thermally-undeformable hard spacers (spacing control member) which are scattered between the glass substrates, and a sealing member which seals the periphery of a gap defined between the glass substrates and has the liquid-crystal introduction opening 35.

The bell jar 31 is degassed under vacuum for removal of gas from the liquid-crystal panel 32 and for deaeration of the liquid crystal 33.

Upon completion of removal of gas from the liquid-crystal panel 32 and deaeration of the liquid crystal 33, the liquid-crystal panel 32 is lowered by operating the transportation mechanism 36, so that the liquid-crystal introduction opening 35 of the liquid-crystal panel 32 is dipped in the liquid crystal 33 in the liquid-crystal pot 34. At this time, the liquid crystal 33 is sucked up into the liquid-crystal panel 32 by capillarity.

When the liquid-crystal panel 32 is filled with the liquid crystal 33 to some extent, an inert gas such as dry nitrogen gas is introduced into the bell jar 31 to raise the inner pressure of the bell jar 31 back to the atmospheric pressure. The inner pressure is further raised to completely fill the liquid-crystal panel 32 with the liquid crystal 33.

To allow the liquid-crystal display panel 32 to display an image with a satisfactory contrast, the spacing between the glass substrates should be precisely controlled and, therefore, the periphery of the liquid-crystal panel should be sealed as uniformly as possible. For this reason, only one liquid-crystal introduction opening 35 having the minimum width (e.g., about 10 mm) is formed on one peripheral side of the liquid-crystal panel 32.

After the filling of the liquid crystal, the gap in the liquid-crystal panel 32 tends to expand due to capillarity on interfaces between the liquid crystal and the glass substrates so that the spacing between the substrates becomes greater than that defined by the hard spacers. Therefore, before the liquid-crystal introduction opening 35 is sealed, an additional process step is required for forcing out excessive liquid crystal. This process step requires about one day, thereby reducing the throughput in the production process.

Where a liquid crystal is to be filled in a large-scale liquid-crystal panel having a larger liquid-crystal filling area, the time required for the liquid-crystal filling process is increased.

Further, in the case of a fast-response ferroelectric liquid-crystal panel, the spacing between glass substrates thereof is extremely small, typically, smaller than 2 $\mu$m and, therefore, the conventional liquid-crystal filling process requires half a day for filling a liquid crystal in the liquid-crystal panel from a small liquid-crystal introduction opening. This reduces the throughput in the fabrication process.

When the liquid crystal is introduced from the small liquid-crystal introduction opening, the flow of the liquid crystal is concentrated around the introduction opening and imposes a stress on surfaces of the orientation films, resulting in disturbance of the alignment of liquid crystal molecules. This reduces the display quality of the resulting liquid-crystal display device, thereby reducing the yield.

These problems result from the fact that a large liquid-crystal introduction opening cannot be formed.

Where a high-viscosity liquid crystal such as a ferroelectric liquid crystal is employed, it is virtually impossible to force out excessive liquid crystal to control the spacing between the glass substrates after the filling of the liquid crystal. Thus, it is extremely difficult to control the spacing between the glass substrates.

In accordance with Example 3, there is provided a process for fabricating an optical switching device, which facilitates the filling of a liquid crystal in a liquid-crystal panel to shorten the time required for the filling of the liquid crystal.

Figure 6A:
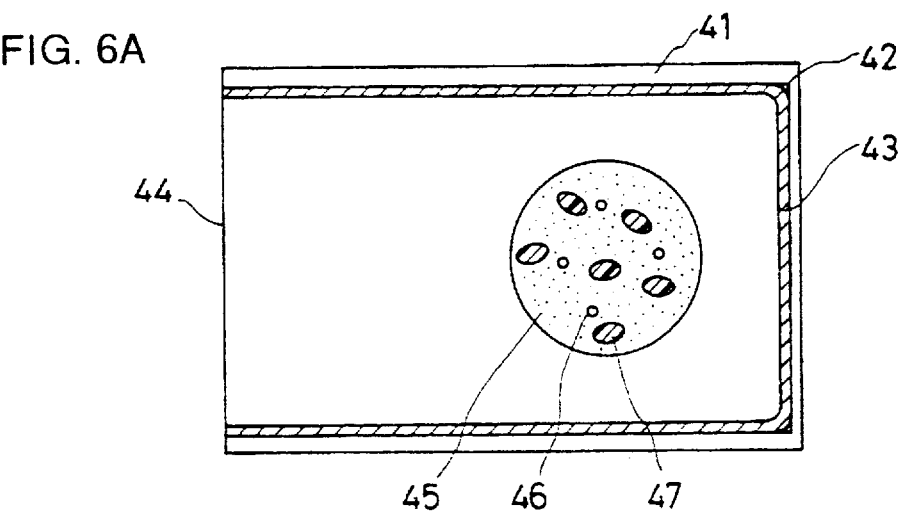
FIGS. 6A and 6B are a plan view and a sectional view, respectively, for explaining a liquid-crystal filling step in a fabrication process for a liquid-crystal display device in accordance with Example 3 of the present invention.
Figure 6B:
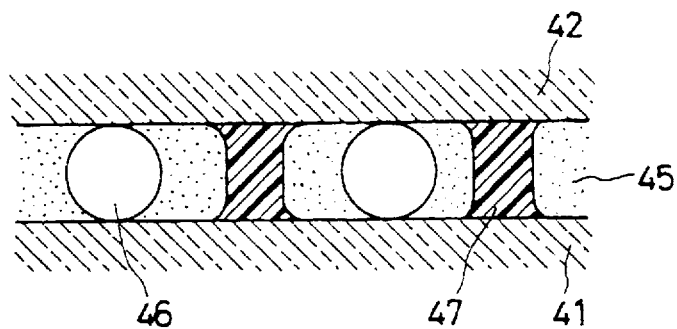

FIGS. 6A and 6B are a plan view and a sectional view, respectively, for explaining a liquid-crystal filling step of a fabrication process for a liquid-crystal light modulation device in accordance with Example 3. In FIGS. 6A and 6B, there are shown glass substrates 41 and 42, a periphery sealing member 43, a liquid-crystal introduction opening 44, a liquid crystal 45, hard spacers 46, and thermosetting resin soft spacers 47.

The liquid-crystal light modulation device includes the thermosetting resin soft spacers 47 and the hard spacers 46 scattered between the glass substrates 41 and 42 each formed with a transparent electrode and an orientation film subjected to a rubbing treatment. The thermosetting resin soft spacers 47 are adapted to be melted or softened to deform and then to cure to adhere to the glass substrates 41 and 42 at a temperature which does not adversely affect the liquid-crystal aligning function of the orientation film (the rubbing effect on the orientation film) before the periphery sealing member 43 is cured. The hard spacers 46 are thermally undeformable.

The hard spacers 46 and the soft spacers 47 are shown in an enlarged view enclosed by a circle in FIG. 6A. These spacers are minute particles.

The hard spacers 46 and the soft spacers 47 are scattered at least in an effective display area which is to be filled with the liquid crystal.

The glass substrates 41 and 42 are thermally press-bonded to each other with the hard spacers 46 and the soft spacers 47 disposed therebetween at the temperature which does not adversely affect the rubbing effect on the orientation films. At this time, the soft spacers 47 are melted by heat, and squashed to a thickness equivalent to an diameter of the thermally-undeformable hard spacers 46. Thus, the soft spacers 47 deform and then cure to combine the glass substrates 41 and 42, so that the spacing between the glass substrates 41 and 42 is defined by diameters of the hard spacers 46. Thereafter, the periphery sealing member 43 cures at a temperature which is higher than the thermosetting point of the soft spacers 47 but does not adversely affect the rubbing effect on the orientation films. It should be noted that the liquid-crystal introduction opening 44 is formed along one peripheral side of the combined glass substrates 41 and 42 and, therefore, the remaining three peripheral sides of of the combined glass substrates 41 and 42 are sealed with the periphery sealing member 43.

Example 3 is characterized in that a liquid crystal is introduced into a liquid-crystal panel from the liquid-crystal introduction opening 44 formed along one entire side of the combined four-sided glass substrates 41 and 42. More specific explanation is given below.

Thin polyimide films having a predetermined thickness were respectively formed on transparent electrodes formed on a pair of 200 mm×100 mm×1.1 t, mm glass substrates 41 and 42 which are to be disposed facing opposite to each other with a liquid crystal 45 retained therebetween. Then, the polyimide films were subjected to a rubbing treatment to be formed into orientation films.

A periphery sealing member 43 of an epoxy resin adapted to cure at 140° C. in one hour was formed on three sides of a peripheral portion of one glass substrate 41 (in a one-side open configuration) by a printing method. The other open side served as a liquid-crystal introduction opening 44.

On the other glass substrate 42 were scattered spherical hard spacers 46 of silicate glass having an average diameter of 1.5 $\mu$m and soft spacers 47 of an epoxy thermosetting resin having diameters of 2 $\mu$m to 4 $\mu$m and adapted to cure at 120° C. in one hour.

Thereafter, the glass substrates 41 and 42 were combined and heated up to a temperature at which the epoxy resin soft spacers 47 and the periphery sealing member 43 were melted at the same time. Then, the combined glass substrates 41 and 42 were pressed from the upper and lower sides thereof so that the soft spacers 47 were squashed and the spacing between the glass substrates 41 and 42 was defined by diameters of the hard spacers 46. The glass substrates 41 and 42 were further heated at 120° C. for one hour to cure the epoxy resin soft spacers 47, and then at 140° C. for one hour to cure the periphery sealing member 43 of the epoxy resin.

A liquid crystal (ferroelectric liquid crystal) mixture in an isotropic phase containing naphthalene base material was filled in a liquid-crystal panel thus fabricated by a vacuum filling method. It took two hours to complete the filling of the liquid crystal.

Finally, the liquid-crystal introduction opening formed on one peripheral side of the liquid-crystal panel was sealed with a sealer of an epoxy resin which cured at 140° C. in one hour.

Figure 7:
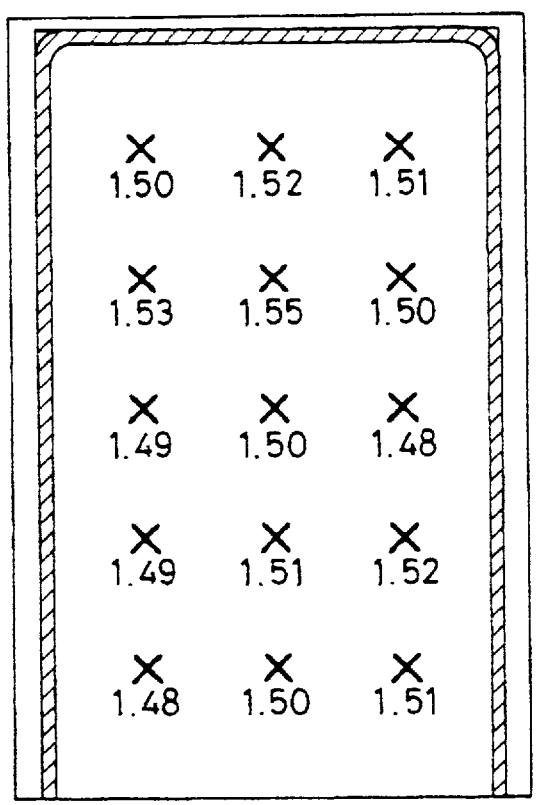
FIG. 7 is an inter-electrode spacing distribution pattern of a liquid-crystal light modulation device in accordance with Example 3 of the present invention.

FIG. 7 is an inter-electrode spacing distribution pattern of the liquid-crystal light modulation device fabricated in accordance with Example 3. As shown, the spacing between the electrodes after the filling of the liquid crystal was 1.5±0.05 µm.

EXAMPLE 4

Figure 8:
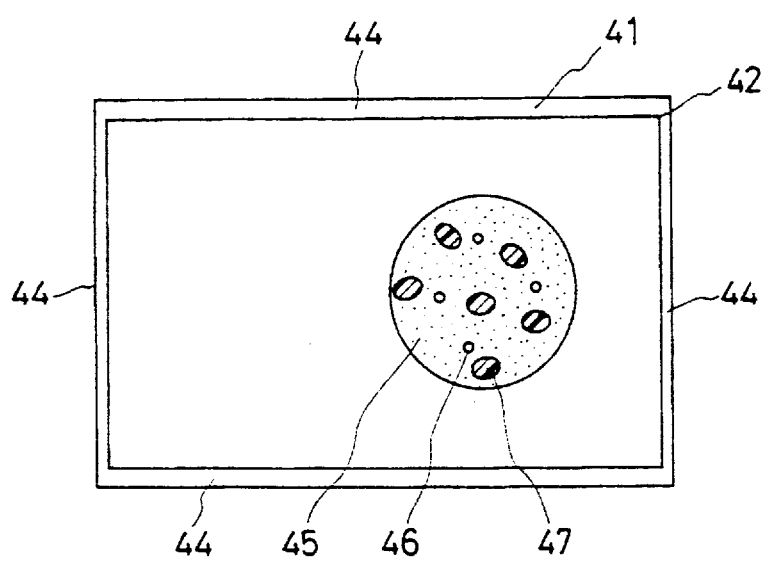
FIG. 8 is a diagram for explaining a liquid-crystal filling step in a fabrication process for a liquid-crystal display device in accordance with Example 4 of the present invention.

FIG. 8 is a diagram for explaining a liquid-crystal filling step of a fabrication process for a liquid-crystal light modulation device in accordance with Example 4. In FIG. 8, there are shown glass substrates 41 and 42, a liquid-crystal introduction opening 44, a liquid crystal 45, hard spacers 46 and thermosetting resin soft spacers 47.

In the liquid-crystal light modulation device, the thermosetting resin soft spacers 47 and the hard spacers 46 are scattered at least in an effective display area between the glass substrates 41 and 42 each formed with a transparent electrode and an orientation film subjected to a rubbing treatment. The thermosetting resin soft spacers 47 are adapted to be melted or softened to deform and then to cure to adhere to the glass substrates 41 and 42 at a temperature which does not adversely affect the rubbing effect on the orientation film before the periphery sealing member is cured. The hard spacers 46 are thermally undeformable.

The glass substrates 41 and 42 are thermally press-bonded to each other with the hard spacers 46 and the soft spacers 47 disposed therebetween at a temperature which does not adversely affect the rubbing effect on the orientation films. At this time, the soft spacers 47 are melted by heat, and squashed to a thickness equivalent to an average diameter of the thermally-undeformable hard spacers 46. Thus, the soft spacers 47 deform and then cure to combine the glass substrates 41 and 42, so that the spacing between the glass substrates 41 and 42 is kept constant by diameters of the hard spacers 46.

Example 4 is characterized in that no periphery sealing member is formed on the periphery of the combined glass substrates 41 and 42 so that a liquid crystal is introduced into a liquid-crystal panel from the entire circumferential opening of the combined glass substrates 41 and 42 serving as a liquid-crystal introduction opening 44. More specific explanation is given below.

Thin polyimide films having a predetermined thickness were respectively formed on transparent electrodes formed on a pair of 200 mm×100 mm×1.1 t, mm glass substrates 41 and 42 which are to be disposed facing opposite to each other with a liquid crystal 45 retained therebetween. Then, the polyimide films were subjected to a rubbing treatment to be formed into orientation films.

On one glass substrate 41 were scattered spherical hard spacers 46 of silicate glass having an average diameter of 1.5 µm and soft spacers 47 of an epoxy thermosetting resin having diameters of 2 µm to 4 µm and adapted to cure at 120° C. in one hour.

Thereafter, the glass substrates 41 and 42 were combined and heated up to a temperature at which the epoxy resin soft spacers 47 were melted. Then, the glass substrates 41 and 42 were pressed from the upper and lower sides thereof so that the soft spacers 47 were squashed and the spacing between the substrates 41 and 42 was defined by diameters of the hard spacers 46. The glass substrates 41 and 42 were further heated at 120° C. for one hour to cure the epoxy resin soft spacers 47.

A liquid crystal (ferroelectric liquid crystal) mixture in an isotropic phase containing naphthalene base material was introduced under the atmospheric pressure into a liquid-crystal panel thus fabricated by applying the liquid crystal dropwise on two adjacent peripheral sides (an L-shaped opening) of the liquid-crystal panel by means of a dispenser. It took 30 minutes to complete the filling of the liquid crystal.

Finally, the entire circumference of the combined glass substrates 41 and 42 was sealed with a sealer of an epoxy resin adapted to cure at 140° C. in one hour.

By introducing the liquid crystal 45 from the two adjacent peripheral sides of the liquid-crystal panel which has open circumference, air or dry nitrogen gas (ambient gas) present between the glass substrates 41 and 42 can be expelled from the other peripheral sides of the liquid-crystal panel during the liquid-crystal filling process, so that no bubble is present in the liquid crystal.

FIG. 9 is an inter-electrode spacing distribution pattern of the liquid-crystal light modulation device fabricated in accordance with Example 4. As shown, the spacing between the electrodes after the filling of the liquid crystal was 1.5±0.05 µm.

EXAMPLE 5

A liquid-crystal light modulation device as shown in FIG. 6 was fabricated in the following manner.

Thin polyimide films having a predetermined thickness were respectively formed on transparent electrodes formed on a pair of 200 mm×100 mm×1.1 t, mm glass substrates 41 and 42 which are to be disposed facing opposite to each other with a liquid crystal 45 retained therebetween. Then, the polyimide films were subjected to a rubbing treatment to be formed into orientation films.

A periphery sealing member 43 of an epoxy resin adapted to cure at 140° C. in one hour was formed on three sides of a peripheral portion of one glass substrate 41 (in a one-side open configuration) by a printing method. The open side served as a liquid-crystal introduction opening 44.

On the other glass substrate 42 were scattered hard spacers 46 of chopped glass fibers having an average diameter of 6.0 µm and soft spacers 47 of an epoxy thermosetting resin having diameters of 8 µm to 10 µm and adapted to cure at 120° C. in one hour.

Thereafter, the glass substrates 41 and 42 were combined and heated up to a temperature at which the epoxy resin soft spacers 47 and the periphery sealing member 43 were melted at the same time. Then, the combined glass substrates 41 and 42 were pressed from the upper and lower sides thereof so that the soft spacers 47 were squashed and the spacing between the glass substrates 41 and 42 was defined by diameters of the hard spacers 46. The glass substrates 41 and 42 were further heated at 120° C. for one hour to cure the epoxy resin soft spacers 47, and then at 140° C. for one hour to cure the periphery sealing member 43 of the epoxy resin.

A super-twisted nematic liquid crystal was filled in the liquid-crystal panel thus fabricated by a vacuum filling method. It took 20 minutes to complete the filling of the liquid crystal.

Finally, the liquid-crystal introduction opening 44 formed along one peripheral side of the liquid-crystal panel was sealed with an ultraviolet-ray-curing resin.

Figure 10:
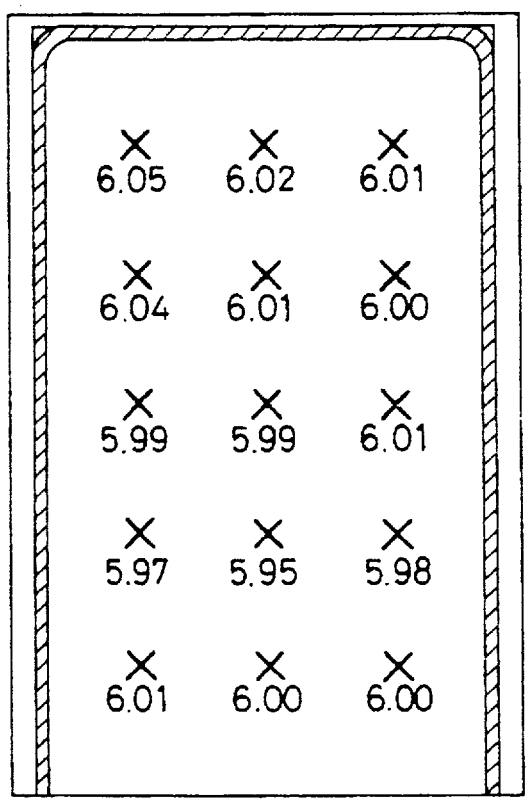

FIG. 10 is an inter-electrode spacing distribution pattern of the liquid-crystal light modulation device in accordance with Example 5. As shown, the spacing between the electrodes after the filling of the liquid crystal was 6.0±0.05 μm.

EXAMPLE 6

A liquid-crystal light modulation device as shown in FIG. 8 was fabricated in the following manner.

Thin polyimide films having a predetermined thickness were respectively formed on transparent electrodes formed on a pair of 200 mm×100 mm×1.1 t, mm glass substrates 41 and 42 which are to be disposed facing opposite to each other with a liquid crystal 45 retained therebetween. Then, the polyimide films were subjected to a rubbing treatment to be formed into orientation films.

On one glass substrate 41 were scattered hard spacers 46 of chopped glass fibers having an average diameter of 6.0 μm and soft spacers 47 of an epoxy thermosetting resin having diameters of 8 μm to 10 μm and adapted to cure at 120° C. in one hour.

Thereafter, the glass substrates 41 and 42 were combined and heated up to a temperature at which the epoxy resin soft spacers 47 were melted. Then, the glass substrates 41 and 42 were pressed from the upper and lower sides thereof so that the soft spacers 47 were squashed and the spacing between the glass substrates 41 and 42 was defined by diameters of the hard spacers 46. The glass substrates 41 and 42 were further heated at 120° C. for one hour to cure the epoxy resin soft spacers 47.

A super-twisted nematic liquid crystal was filled in a liquid-crystal panel thus fabricated by a vacuum filling method. It took 10 minutes to complete the filling of the liquid crystal.

Finally, the entire circumference of the liquid-crystal panel was sealed with an ultraviolet-ray-curing resin.

FIG. 11 is an inter-electrode spacing distribution pattern of the liquid-crystal light modulation device in accordance with Example 6. As shown, the spacing between the electrodes after the filling of the liquid crystal was 6.0±0.05 μm.

For comparison with Examples 3 to 6, liquid-crystal light modulation devices each having a construction partially different from the characteristic constructions of Examples 3 to 6 were fabricated.

Comparative Examples 3 to 6 correspond to Examples 3 to 6, respectively.

Comparative Example 3

A liquid-crystal light modulation device was fabricated in substantially the same manner as in Example 3, except that the epoxy resin soft spacers were not used and a periphery sealing member having a 10 mm-wide liquid-crystal introduction opening was formed on the peripheral portion of a glass substrate.

A ferroelectric liquid crystal mixture in an isotropic phase containing naphthalene base material was filled in a liquid-crystal panel thus fabricated by a vacuum filling method. It took twelve hours to complete the filling of the liquid crystal.

Finally, the liquid-crystal introduction opening was sealed with an epoxy resin sealer which was cured at 140° C. in one hour.

Figure 12:
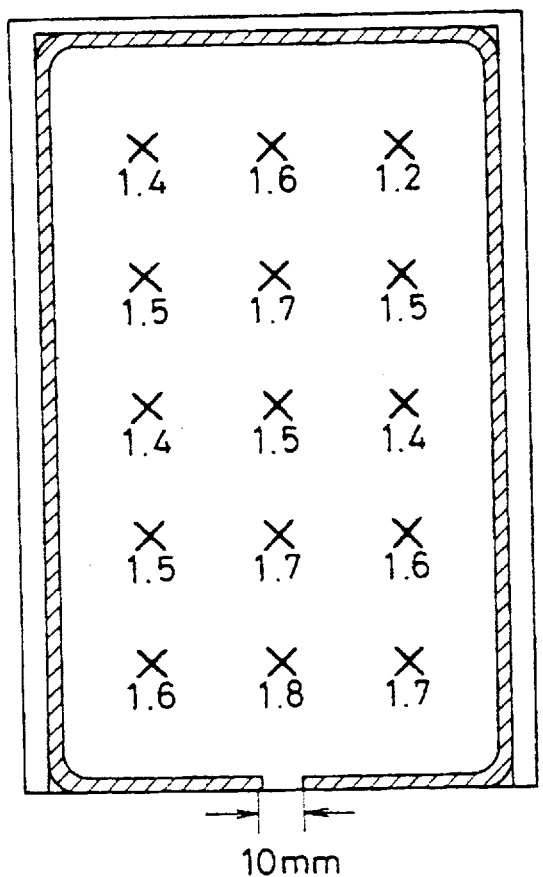
FIGS. 12 to 15 are inter-electrode spacing distribution patterns of liquid-crystal light modulation devices in accordance with Comparative Examples 3 to 6, respectively.

FIG. 12 is an inter-electrode spacing distribution pattern of the liquid-crystal light modulation device in accordance with Comparative Example 3. As shown, the spacing between the electrodes after the filling of the liquid crystal was 1.5±0.3 μm, and the central portion and a portion around the liquid-crystal introduction opening of the device were expanded.

Comparative Example 4

A liquid-crystal light modulation device was fabricated in substantially the same manner as in Example 4, except that the epoxy resin soft spacers were not used and two opposing peripheral sides of combined glass substrates were sealed with periphery sealing members of an epoxy resin adapted to cure at 140° C. in one hour. This is because it was impossible to fix the glass substrates together without the use of the epoxy resin soft spacers and to fill a liquid crystal therebetween.

A ferroelectric liquid crystal mixture in an isotropic phase containing naphthalene base material was applied dropwise on one of the unsealed sides of the combined glass substrates by means of a dispenser and filled between the glass substrates by a temperature difference. It took two hours to complete the filling of the liquid crystal.

Finally, the two unsealed sides of the combined glass substrates were sealed with an epoxy resin sealer which cured at 140° C. in one hour.

Figure 13:
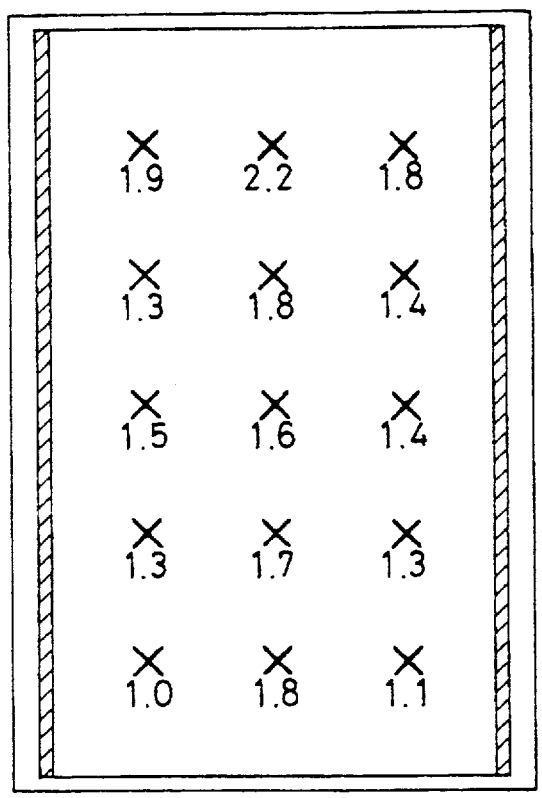

FIG. 13 is an inter-electrode spacing distribution pattern of the liquid-crystal light modulation device in accordance with Comparative Example 4. As shown, the spacing between the electrodes after the filling of the liquid crystal was 1.5±0.7 μm.

Comparative Example 5

A liquid-crystal light modulation device was fabricated in substantially the same manner as in Example 5, except that the epoxy resin soft spacers were not used and a periphery sealing member having a 10 mm-wide liquid-crystal introduction opening was formed on a peripheral portion of a glass substrate.

A super-twisted nematic (STN) liquid crystal was filled in a liquid-crystal panel thus fabricated by a vacuum filling method. It took two hours to complete the filling of the liquid crystal.

Finally, the liquid-crystal introduction opening was sealed with an ultraviolet-ray-curing resin.

Figure 14:
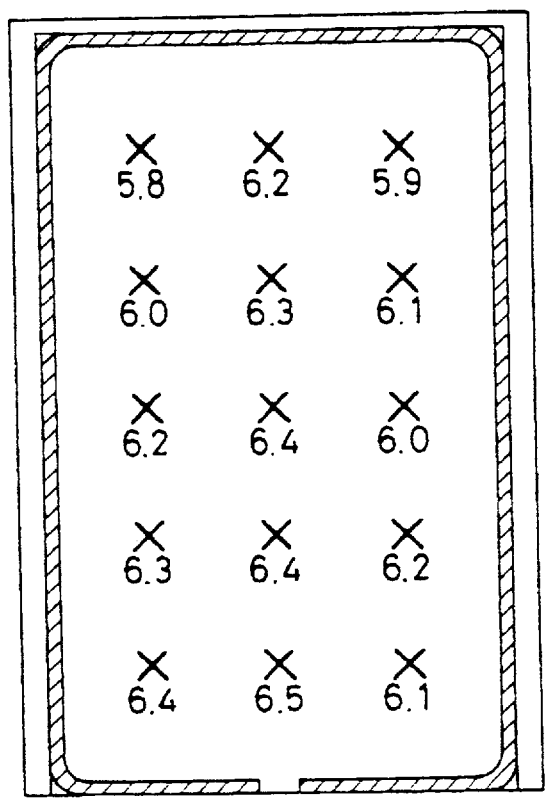

FIG. 14 is an inter-electrode spacing distribution pattern of the liquid-crystal light modulation device in accordance with Comparative Example 5. As shown, the spacing between the electrodes after the filling of the liquid crystal was 6.0±0.5 μm.

Comparative Example 6

A liquid-crystal light modulation device was fabricated in substantially the same manner as in Example 6, except that the epoxy resin soft spacers were not used and two opposing peripheral sides of combined glass substrates were sealed with periphery sealing members of an epoxy resin adapted to cure at 140° C. in one hour. This is because it was impossible to fix the glass substrates together without the use of the epoxy resin soft spacers and to fill a liquid crystal therebetween.

A super-twisted nematic liquid crystal was introduced into a liquid-crystal panel thus fabricated from one of the unsealed side of the panel by a temperature difference. It took 20 minutes to complete the filling of the liquid crystal.

Finally, the two unsealed sides of the panel were sealed with an ultraviolet-ray-curing resin.

Figure 15:
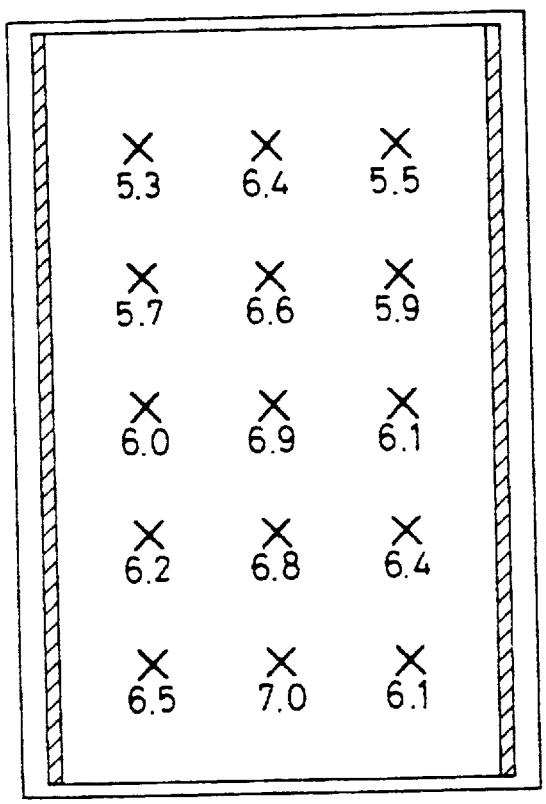

FIG. 15 is an inter-electrode spacing distribution pattern of the liquid-crystal light modulation device in accordance with Comparative Example 6. As shown, the spacing between the electrodes after the filling of the liquid crystal was 6.0±1.0 μm.

The characteristics of the liquid-crystal switching devices of Examples 3 to 6 and Comparative Examples 3 to 6 are collectively shown below.

|  | Example 3 | Comparative Example 3 |
|---|---|---|
| Liquid crystal | Ferroelectric liquid crystal | Ferroelectric liquid crystal |
| Diameter of spacer | 1.5 μm | 1.5 μm |
| Configuration of sealing member | One-side open | With liquid-crystal introduction opening formed on one side |
| Time required | 2.0 hours | 12 hours |
| Variation in spacing | 1.5 ± 0.05 μm | 1.5 ± 0.3 μm |

|  | Example 4 | Comparative Example 4 |
|---|---|---|
| Liquid crystal | Ferroelectric liquid crystal | Ferroelectric liquid crystal |
| Diameter of spacer | 1.5 μm | 1.5 μm |
| Configuration of sealing member | Not provided | Two opposing sides |
| Time required | 0.5 hours | 2 hours |
| Variation in spacing; | 1.5 ± 0.05 μm | 1.5 ± 0.7 μm |

|  | Example 5 | Comparative Example 5 |
|---|---|---|
| Liquid crystal | STN liquid crystal | STN liquid crystal |
| Diameter of spacer | 6.0 μm | 6.0 μm |
| Configuration of sealing member | One-side open | With liquid-crystal introduction opening formed on one side |
| Time required | 20 minutes | 120 minutes |
| Variation in spacing | 6.0 ± 0.05 μm | 6.0 ± 0.5 μm |

|  | Example 6 | Comparative Example 6 |
|---|---|---|
| Liquid crystal | STN liquid crystal | STN liquid crystal |
| Diameter of spacer | 6.0 μm | 6.0 μm |
| Configuration of sealing member | Not provided | Two opposing sides |
| Time required | 10 minutes | 20 minutes |
| Variation in spacing | 6.0 ± 0.05 μm | 6.0 ± 1.0 μm |

As shown above, the time required for filling the liquid crystal in the liquid-crystal light modulation device and the variation in the spacing in each Example were significantly reduced in comparison with the corresponding Comparative Example.

In accordance with the foregoing examples, a liquid-crystal introduction opening is formed along at least one entire peripheral side of a polygonal (typically four-sided) liquid-crystal panel having a gap defined between a pair of glass substrates to be filled with a liquid crystal. Such a construction can be realized by utilizing a novel spacer technique which employs conventional thermally-undeformable hard spacers and thermosetting resin soft spacers in combination.

This novel spacer technique enables the thermosetting resin soft spacers to serve as an adhesion for bonding the substrates, requiring a reduced substrate-bonding ability of the periphery sealing member. Therefore, even if a large liquid-crystal introduction opening is provided, the substrates can be satisfactorily bonded to each other.

By optimizing the substrate-bonding ability of the thermosetting resin soft spacers scattered between the substrates along with the hard spacers, the periphery sealing member can be formed only in a limited area of the liquid-crystal panel or can be almost dispensed with. In this case, the liquid crystal can be filled in the panel in a shorter time by first applying the liquid crystal onto the entire liquid-crystal introduction opening under vacuum and then raising the surrounding pressure back to the atmospheric pressure.

Since the liquid crystal can be introduced from a larger liquid-crystal introduction opening (or from any peripheral sides of the liquid-crystal panel), the damage to the orientation films by the liquid crystal can be reduced. In addition, the filling of the liquid crystal can be facilitated, thereby increasing the yield.

This liquid-crystal filling method is particularly useful for the fabrication of a large-scale liquid-crystal panel such as of a diagonal size of greater than 10 inches.

With this liquid-crystal filling method, a large liquid-crystal introduction opening can be formed and the liquid crystal can be filled in the liquid-crystal panel by applying the liquid crystal dropwise onto the entire liquid-crystal introduction opening by means of a dispenser, not by dipping the liquid-crystal panel in a liquid-crystal pot in the conventional manner.

With this liquid-crystal filling method, the amount of liquid crystal required to be filled in one liquid-crystal panel can be reduced, thereby reducing the production cost.

The formation of a large liquid-crystal introduction opening significantly speeds up the filling of the liquid crystal even when the liquid crystal is filled by dipping the liquid-crystal panel in a liquid-crystal pot.

Although four-sided substrates are employed as the substrates which retain the liquid crystal therebetween in the foregoing examples, triangular or circular substrates or flexible nonplanar substrates may be used.

In accordance with Examples 1 and 2, the optical switching devices each comprises: two or more substrates at least having a transparent electrodes formed thereon; thermally-undeformable hard spacers and soft spacers adapted to be melted or softened by heat to deform and then to cure to adhere to the substrates, the hard spacers and the soft spacers being scattered between the substrates so that the spacing between the substrates is kept constant by diameters of the hard spacers; a medium with an optical switching function filled in a gap defined between the substrates; and a thermosetting resin sealer which seals the periphery of the gap between the substrates. The optical switching devices have the following advantages:

(1) Since the thermosetting resin sealer provided on the periphery of the gap between the substrates has a thermosetting point equal to or higher than the thermosetting point of the soft spacers, the soft spacers are first cured during a heat-treatment process to adhere to the substrates so that the gap is formed between the electrodes, and then the thermosetting resin sealer is cured by subsequent heating to seal the periphery of the gap with the spacing between the electrodes being kept constant.

If the thermosetting resin sealer is adapted to cure before the curing of the soft spacers, the soft spacers cannot be squashed to a thickness equivalent to the diameter of the hard spacers. In such a case, the spacing between the electrodes cannot be kept constant.

(2) Since the thermosetting point of the soft spacers is such that the rubbing effect on the orientation films is not adversely affected, a higher display quality is ensured.

(3) The thermosetting points of the thermosetting resin sealer and the soft spacers are such that the rubbing effect on the orientation films is not adversely affected, and the thermosetting point of the thermosetting resin sealer is equal to or higher than the thermosetting point of the soft spacers (typically 110° C. to 150° C.). Therefore, the sealer and the soft spacers can withstand an annealing process to be thereafter performed for the re-alignment of liquid crystal molecules, and do not adversely affect the rubbing effect on the orientation films. Thus, the above advantages (1) and (2) can be simultaneously ensured.

(4) The thermosetting resin soft spacers and the thermosetting resin sealer are melted and cured in two or more heat-treatment steps. That is, the soft spacers and the thermosetting resin sealer are melted at a first temperature, and then cured at a second temperature which is higher than the first temperature. Thus, the thermosetting resin soft spacers and sealer can be cured within two hours, so that the throughput can be improved.

(5) The thermally-undeformable hard spacers are coated with a thermoplastic resin adapted to exhibit its thermoplastic property at a temperature lower than 150° C. Therefore, the thermoplastic resin coating is melted during the heat treatment to adhere the hard spacers onto the surfaces of the orientation films. Thus, the scattered state of the hard spacers can be maintained.

(6) Since the hard spacers, the soft spacers and the thermosetting resin sealer each have a linear expansion coefficient of $10^{-4}$ to $10^{-6}$/°C. which is compatible with the linear expansion coefficient of the liquid crystal, the generation of bubbles in the liquid crystal due to a temperature change can be prevented.

If bubbles are generated in the liquid crystal at a relatively low temperature, the liquid crystal is expelled from the bubbled areas of the liquid-crystal display device, which no longer exhibits its optical switching function. The bubbles will not disappear even at a higher temperature and, therefore, it is impossible to recover the optical switching function.

(7) Since the soft spacers have an average diameter less than three times the average diameter of the hard spacers, the soft spacers can be squashed to a thickness equivalent to the diameter of the hard spacers when the substrates are combined during the heat treatment.

(8) Since the hard spacers and the soft spacers are uniformly scattered between the substrates at scattering densities of 5 to 20/mm$^2$ and 50 to 200/mm$^2$, respectively, for example by a dry scattering method, the spacing between the electrodes can be kept constant, and a sufficient adhesive strength can be provided between the substrates. In addition, the opening ratio can be maintained within a permissible range.

(9) The soft spacers are formed of one or more thermosetting resins selected from the group consisting of phenol resins, urea resins, melamine resins, alkyd polyester resins, unsaturated polyester resins, silicon-containing resins, polyurethane resins, epoxy resins, furan resins, xylene resins, ketoneformaldehyde resins, aniline resins, sulfonamide resins, diarylphthalate resins, silicone resins and resorcin resins. Thus, the soft spacers are melted or softened by heat and then cured to exhibit a satisfactory adhesive ability.

(10) Where the hard spacers comprise rigid spherical particles made of one or more organic synthetic resins selected from the group consisting of cross-linked polystyrene polymers, cross-linked divinylbenzene polymers and amino resins. Where the hard spacers comprise inorganic particles of one or more kinds such as chopped glass fibers, spherical silicate glass particles and alumina powder which have uniform diameters, the spacing between the electrodes can be kept exactly at a predetermined value.

(11) The hard spacers may be coated with one or more thermoplastic resins selected from the group consisting of polyvinyl chloride resins, polyvinylidene chloride resins, polyvinyl acetate resins, polymethacryl resins, polyacrylate resins, polystyrene resins, polyamide resins, polyethylene resins, polypropylene resins, fluorine-containing resins, polyacrylonitrile resins, polyvinyl ether resins, polyvinyl ketone resins, polyether resins, polycarbonate resins, chlorinated polyether resins, polyvinyl pyrrolidone resins and saturated polyester resins, which exhibit the thermoplastic property at a temperature lower than 150° C. Thus, the hard spacers can be sufficiently adhared to the substrates, so that the movement of the hard spacers between the substrates can be prevented.

(12) Where the optical switching device is embodied as a plasma display device, an electrochromic display device or a field-emission-array display device, the spacing between the substrates thereof can readily be kept uniform.

(13) Where the optical switching device is applied to a display device employing a twisted nematic liquid crystal, a super-twisted nematic liquid crystal, a nematic-cholesteric phase transition liquid crystal, a polymer dispersion liquid crystal, a ferroelectric liquid crystal, an antiferroelectric liquid crystal, a twist grain boundary liquid crystal or a smectic A phase liquid crystal exhibiting an electroclinic effect, the features of the present invention are effective.

In accordance with Examples 3 to 6, there are provided the processes for fabricating an optical switching device having two or more polygonal (typically four-sided) substrates at least having a transparent electrode, hard spacers and thermosetting soft spacers scattered between the substrates so that a spacing between the substrates is kept constant by diameters of the hard spacers, and a liquid crystal filled in a gap defined between the substrates. The processes have the following advantages:

(14) The liquid crystal introduction opening is formed along at least one entire peripheral side of the combined polygonal substrates (i.e., the periphery sealing member is provided on the periphery of the combined substrates with at least one entire peripheral side thereof left open). Therefore, the liquid crystal can be filled in the gap between the substrates in a shorter time by applying the liquid crystal onto the open side of the combined substrates and then introducing the liquid crystal into the gap.

(15) Where no or virtually no periphery sealing member is provided (i.e., all the peripheral sides of the combined polygonal substrates are open), the liquid crystal can be filled in the gap in a shorter time by applying the liquid crystal onto all or part of the open sides of the combined substrates and then introducing the liquid crystal into the gap.

(16) In this case, the introduction of the liquid crystal can be achieved by changing the ambient pressure or temperature after the liquid crystal is applied on the periphery of the combined substrates. Therefore, the liquid crystal can be efficiently filled in the gap of the combined substrate.

(17) Since the liquid crystal is applied dropwise on the periphery of the combined substrates by means of a dispenser, the application of the liquid crystal can readily and quantitatively be performed.

(18) By employing a twisted nematic liquid crystal, a super-twisted nematic liquid crystal, a nematic-cholesteric phase transition liquid crystal, a polymer dispersion liquid crystal, a ferroelectric liquid crystal, an antiferroelectric liquid crystal, a twist grain boundary liquid crystal or a smectic A phase liquid crystal exhibiting an electroclinic effect, the features of the present invention can be effectively realized.

The present invention will next be described by way of Examples 7 to 13.

Figure 16A:
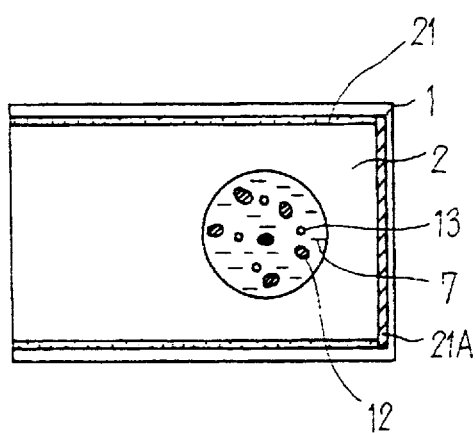
FIGS. 16A and 16B are a plan view and a sectional view, respectively, of liquid-crystal light modulation devices fabricated in accordance with Examples 7 to 10.
Figure 16B:
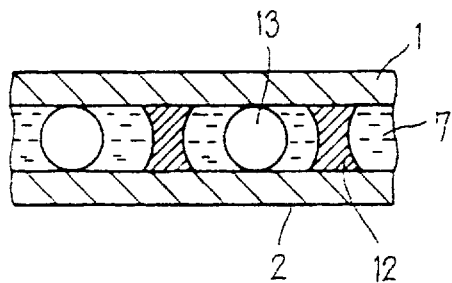

FIGS. 16A and 16B are a plan view and a sectional view, respectively, of a liquid-crystal light modulation device fabricated in accordance with Examples 7 to 10. As shown, the liquid-crystal light modulation device comprises glass substrates 1 and 2 each formed with an electrode and an orientation film subjected to a rubbing treatment, and thermosetting soft spacers 12 and thermally-undeformable hard spacers (gap controlling member) 13 scattered between the glass substrates 1 and 2. The thermosetting resin soft spacers 12 are adapted to be melted and softened during a heat treatment at a temperature which does not adversely affect the rubbing effect on the orientation film.

First and second periphery sealing members 21 and 21A are provided between peripheral portions of the glass substrates 1 and 2. The first sealing members 21 provided on two opposing peripheral sides of the glass substrates serve to temporarily fix the substrates together before a liquid-crystal filling process.

The soft spacers 12 are made of a thermosetting resin such as an epoxy resin and adapted to be melted or soften by heat and then cure to bond to the glass substrates 1 and 2. Used as the hard spacers 13 are, for example, spherical silicate glass particles which serve to define the spacing between the glass substrates. The first and second periphery sealing members 21 and 21A are made of an epoxy resin which is adapted to be cured at a temperature higher than the thermosetting point of the thermosetting resin soft spacers 12 scattered between the glass substrates 1 and 2.

Figure 17:
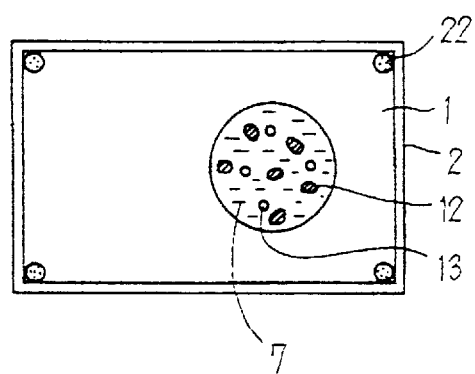
FIG. 17 is a plan view of liquid-crystal light modulation devices fabricated in accordance with Examples 11 to 13.

FIG. 17 is a plan view of a liquid-crystal light modulation device fabricated in accordance with Examples 11 to 13. A difference between the liquid-crystal light modulation devices shown in FIGS. 16A and 16B and FIG. 17 is that the first periphery sealing members 21 for temporarily fixing the glass substrates 1 and 2 together are of a dot shape.

Like the device shown in FIGS. 16A and 16B, the liquid-crystal light modulation device includes thermosetting resin soft spacers 12 and hard spacers (spacing controlling member) 13 scattered in a gap defined between glass substrates 1 and 2, a liquid crystal filled between the glass substrates 1 and 2, first periphery sealing members 21 in a dot shape respectively provided in four corners between the glass substrates, and second periphery sealing members provided between peripheral portions of the glass substrates for controlling the gap between the glass substrates.

With this arrangement, the first periphery sealing members 21 for temporarily fixing the glass substrates together are provided in a smaller area than the device shown in FIGS. 16A and 16B, i.e., large liquid-crystal introduction openings are formed. Thus, the time required for the filling of the liquid crystal can be reduced.

There will next be described fabrication processes for the aforesaid liquid-crystal light modulation devices in accordance with Examples 7 to 13.

EXAMPLE 7

Figure 18A:
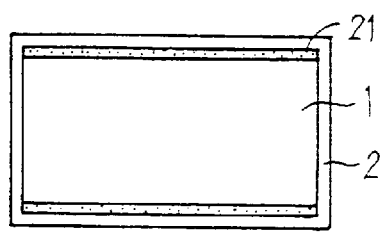
FIGS. 18A to 18C are plan views for explaining a fabrication process according to Example 7.

In a process illustrated in FIG. 18A, a transparent electrode was formed on each of 200 mm×100 mm×1.1 t, mm glass substrates 1 and 2, and then a thin polyimide film was formed thereon which was subjected to a rubbing treatment to be formed into an orientation film.

A wettable epoxy resin adapted to cure at 140° C. in one hour was deposited to a thickness of 5 μm in 0.2 mm-wide edge portions (dotted portions) on two opposing peripheral sides of one glass substrate 1 by a printing method to form first periphery sealing members 21 for temporarily fixing the glass substrates together.

Though not shown, spherical silicate glass hard spacers having an average diameter of 1.5 μm and soft spacers of an epoxy resin adapted to cure at 120° C. in one hour and having diameters of 2 to 4 μm were scattered on the other glass substrate 2.

Then, the glass substrates 1 and 2 were combined. A notable point is that the first periphery sealing members 21 for temporarily fixing the glass substrates I and 2 together exhibited wettability before they were thermoset whereby the first periphery sealing members 21 tightly adhered to the upper and lower glass substrates 1 and 2 and prevented the glass substrates 1 and 2 from being offset with respect to each other.

In turn, the combined glass substrates 1 and 2 were pressed from the upper and lower sides thereof at the melting point (120° C.) of the epoxy resin soft spacers so that the soft spacers were squashed and the spacing between the glass substrates 1 and 2 was defined by diameters of the silicate glass hard spacers. In this state, the epoxy resin soft spacers were cured in one hour. Thereafter, the combined glass substrates were heated up to 140° C. to cure the first periphery sealing members 21 (temporal fixing members) in one hour. The first periphery sealing members 21 thus cured had a width of about 0.6 mm and a thickness of 1.5 μm which was equivalent to the spacing between the substrates.

Figure 18B:
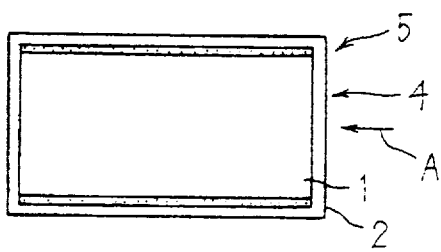

In a process shown in FIG. 18B, a ferroelectric liquid crystal mixture in an isotropic phase containing naphthalene base material was introduced into the gap in an uncompleted liquid-crystal panel 5 from one of the open sides of the panel (which served as a liquid-crystal introduction opening 4) as indicated by an arrow A. The filling of the liquid crystal was achieved by a pressure difference produced by sucking inside air from the panel. It took two hours to complete the filling of the liquid crystal. The spacing between the glass substrates was 1.5±0.05 μm.

Figure 18C:
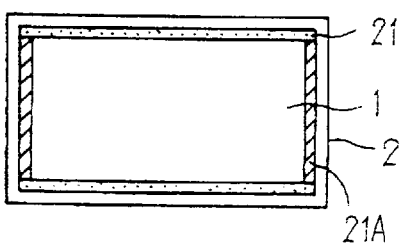

In a process shown in FIG. 18C, the two open sides of the combined glass substrates 1 and 2 including the liquid-crystal introduction opening 4 was sealed with second periphery sealing members 21A of the epoxy resin adapted to cure at 140° C. in one hour (the same resin as used for the first periphery sealing members 21). Thus, the liquid-crystal panel was completed. In the liquid-crystal light modulation device (liquid-crystal panel), the proportion of the effective display area was 98% with respect to the total area.

To demonstrate the effectiveness of the process of Example 7, liquid-crystal panels were fabricated in the following manner for comparison.

Comparative Example 7

A liquid-crystal light modulation device (liquid-crystal panel) was fabricated in substantially the same manner as in Example 7, except that the epoxy resin soft spacers adapted to adhere to inner surfaces of the glass substrates were not employed and a 1.5 mm-wide periphery sealing member having a 10 mm-long liquid-crystal introduction opening was provided on the periphery of the liquid-crystal panel. A ferroelectric liquid crystal mixture in an isotropic phase containing naphthalene base material was filled in a gap of the panel by a vacuum filling method. It took 12 hours to complete the filling of the liquid crystal. The spacing between the substrates after the filling of the liquid crystal was 1.5+0.3 μm, and the central portion and a portion around the liquid-crystal introduction opening of the panel were expanded. In the liquid-crystal light modulation device, the proportion of the effective display area was 90%, which was lower than that in Example 7.

Comparative Example 8

A liquid-crystal light modulation device (liquid-crystal panel) was fabricated in substantially the same manner as in Example 7, except that the first periphery sealing members (temporal fixing members) were not provided and the glass substrates 1 and 2 were adhere only with epoxy resin soft spacers scattered between the glass substrates 1 and 2. When the upper and lower glass substrates 1 and 2 were combined, the glass substrates were not successfully fixed together and the soft spacers were cured in a state where the glass substrates were offset with respect to each other. Therefore, an intended pixel array was not precisely formed.

Comparative Example 9

A liquid-crystal light modulation device (liquid-crystal panel) was fabricated in substantially the same manner as in Example 7, except that the first periphery sealing members (temporal fixing members) having a reduced width of 0.03 mm were formed. Although the width of the cured first periphery sealing members was 0.06 mm, the adhesive force was insufficient even with the aid of the soft spacers so that the glass substrates were separated from each other.

EXAMPLE 8

Figure 19A:
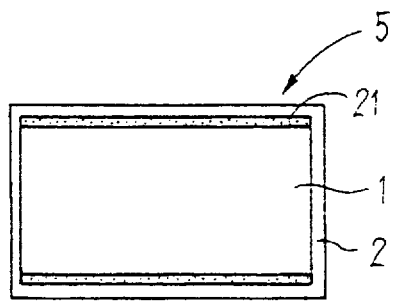
FIGS. 19A and 19B are plan views for explaining a fabrication process according to Example 8.
Figure 19B:
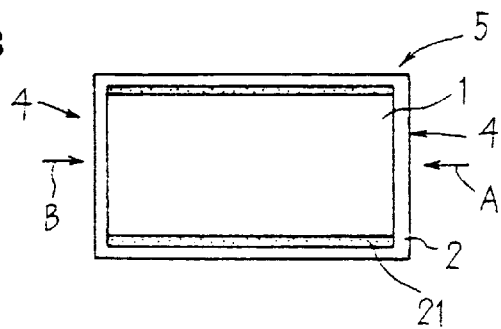

In Example 8 illustrated in FIGS. 19A and 19B, a liquid-crystal panel 5 as shown in FIG. 19A was fabricated in the same manner as in Example 7. Then, a ferroelectric liquid crystal mixture in an isotropic phase containing naphthalene base material was introduced into a gap of the panel 5 from two unsealed sides of the panel 5 (which served as liquid-crystal introduction openings) as indicated by arrows A and B in FIG. 19B by a vacuum filling method. It took one hour to complete the filling of the liquid crystal. Thus, the time required for the filling of the liquid crystal was reduced to half in comparison with Example 7.

EXAMPLE 9

Figure 20A:
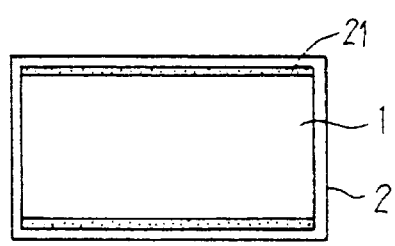
FIGS. 20A and 20B are plan views for explaining a fabrication process according to Example 9.
Figure 20B:
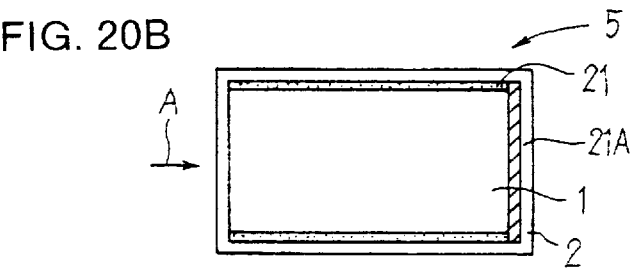

In Example 9 illustrated in FIGS. 20A and 20B, inward portions of glass substrates 1 and 2 were adhered with epoxy resin soft spacers and peripheral portions thereof were adhered with first periphery sealing members 21 (temporal fixing members) provided on two opposing peripheral sides thereof in the same manner as in Example 7. Then, an epoxy resin adapted to cure at 140° C. in one hour was applied dropwise on one of two unsealed sides of the combined glass substrates by means of a dispenser, and cured for the provision of a second periphery sealing member 21A (portion shaded by oblique lines in FIG. 20B).

In turn, a ferroelectric liquid crystal mixture in an isotropic phase containing naphthalene base material was 5 introduced into a gap of the panel 5 from the other unsealed side of the panel 5 as indicated by an arrow A in FIG. 20B by a pressure difference between the inside and outside of the panel. The time required for the filling of the liquid crystal was two hours which was equal to that in Example 7.

Although the time required for the filling of the liquid crystal was longer than that in Example 8, the liquid crystal flowed in one direction when introduced into the gap and, therefore, the alignment of liquid crystal molecules was more stable. Thus, the resulting liquid-crystal panel had a stable display quality.

EXAMPLE 10

Figure 21A:
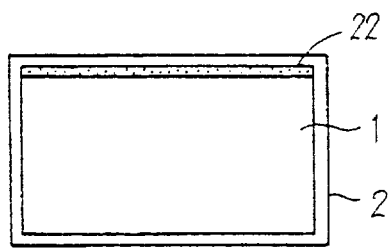
FIGS. 21A and 21B are plan views for explaining a fabrication process according to Example 10.
Figure 21B:
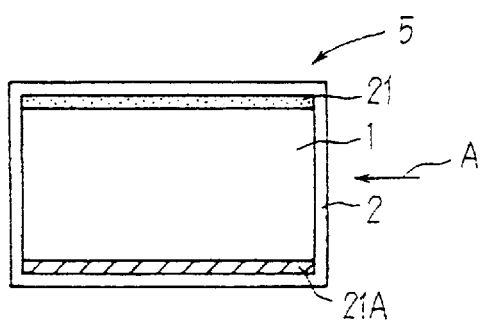

In Example 10 illustrated in FIGS. 21A and 21B, a thermosetting resin was deposited on one edge portion of one glass substrate 1 by a printing method to form a first periphery sealing member 21 for temporarily fixing glass substrates 1 and 2 as shown in FIG. 21A. The glass substrates 1 and 2 were combined, and the first periphery sealing member 21 was cured along with epoxy resin soft spacers scattered between the glass substrates 1 and 2.

In turn, an epoxy resin adapted to cure at 140° C. in one hour was applied dropwise on an unsealed side opposite to the sealed side of the combined glass substrates 1 and 2 by means of a dispenser, and then cured for formation of a second periphery sealing member 21A, as shown in FIG. 21B. The dropwise application of the epoxy resin was achieved by ejecting the diluted epoxy resin with its solvent from a commercially available syringe-type dispenser filled therewith.

Then, a ferroelectric liquid crystal mixture in an isotropic phase containing naphthalene base material was introduced into a gap of a liquid-crystal panel 5 thus fabricated from one unsealed side thereof as indicated by an arrow A by a pressure difference produced by sucking inside air from the other unsealed side of the panel. The time required for the filling of the liquid crystal was two hours, which was equal to that in Example 7.

EXAMPLE 11

Figure 22A:
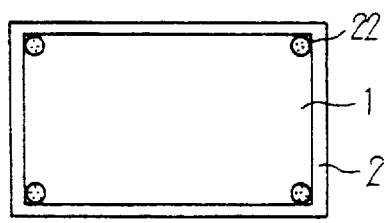
FIGS. 22A and 22B are plan views for explaining a fabrication process according to Example 11.
Figure 22B:
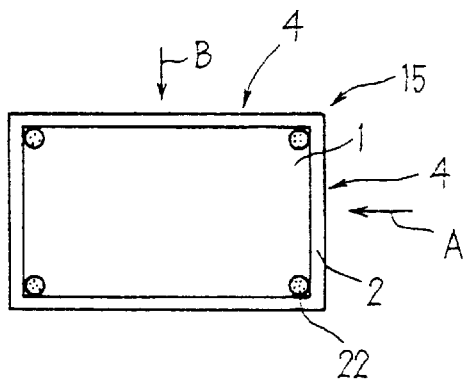

In Example 11 illustrated in FIGS. 22A and 22B, dot-shaped temporal fixing members were used. A transparent electrode and an orientation film of a thin polyimide film were successively formed on each of 200 mm×100 mm×1.1 t, mm glass substrates 1 and 2.

Then, cylindrical temporal fixing members 22 of a wettable epoxy resin adapted to cure at 140° C. in one hour and having a thickness of 8 μm and a diameter of 0.2 mm were dispensed on four corners of one glass substrate 1 (indicated as dotted portions in FIG. 22A).

In turn, hard spacers (spacing controlling member) of chopped glass fibers having an average diameter of 6.0 μm and epoxy resin soft spacers adapted to cure at 130° C. in one hour and having diameters of 8 μm to 10 μm were scattered on the other substrate 2.

Thereafter, the glass substrates 1 and 2 were combined. Since the temporal fixing members 22 provided in the four corners of the combined glass substrates exhibited a wettability, the positional offset of the glass substrates 1 and 2 was prevented for precise formation of an intended pixel array.

In turn, the combined glass substrates 1 and 2 were pressed from the upper and lower sides thereof at a melting point (130° C.) of the epoxy resin soft spacers and the temporal fixing members 21 so that the soft spacers were squashed and the spacing between the combined substrates 1 and 2 was defined by diameters of the hard spacers. The epoxy resin soft spacers were cured in about one hour. The combined glass substrates were further heated up to 140° C. to cure the cylindrical temporal fixing members 22 in about one hour. The temporal fixing members 22 thus cured had a thickness of 6.0 μm and a diameter of about 0.2 mm to about 0.3 mm.

Then, a super-twisted nematic liquid crystal was applied dropwise on two adjacent peripheral sides (serving as liquid-crystal introduction openings 4) of the combined glass substrates 1 and 2 as indicated by arrows A and B by means of a dispenser. The liquid crystal was introduced into a gap defined between the glass substrates by a pressure difference between the inside and outside of the panel. It took 20 minutes to complete the filling of the liquid crystal. The spacing between the glass substrates after the filling of the liquid crystal was 6.0±0.05 μm.

Finally, all the peripheral sides of the combined glass substrates 1 and 2 including the liquid-crystal introduction openings 4 were sealed with a periphery sealing member of an ultraviolet-ray-curing resin. Thus, the liquid-crystal panel was completed.

In accordance with Example 11, the cylindrical temporal fixing members 22 are provided in the four corners of the combined glass substrates 1 and 2. Therefore, large liquid-crystal introduction openings can be formed to facilitate the filling of the liquid crystal. In addition, the resulting liquid-crystal panel has a larger effective display area.

EXAMPLE 12

Figure 23A:
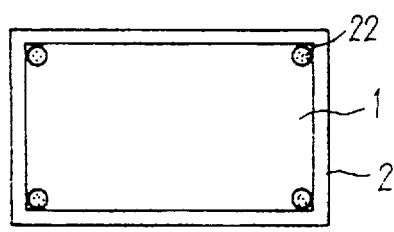
FIGS. 23A and 23B are plan views for explaining a fabrication process according to Example 12.
Figure 23B:
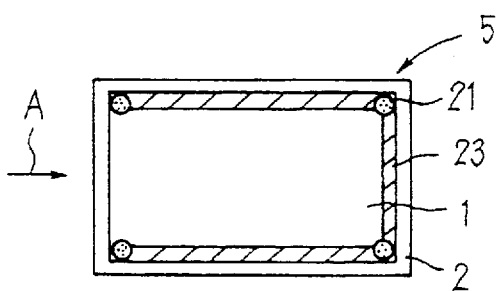

In Example 12 illustrated in FIGS. 23A and 23B, soft spacers of an epoxy thermosetting resin scattered between glass substrates 1 and 2 and dot-shaped temporal fixing members 22 formed in four corners of the substrates were cured in the same manner as in Example 11 (see FIG. 23A).

Then, an ultraviolet-ray-curing resin was applied dropwise on three peripheral sides of the combined four-sided glass substrates by means of a dispenser, and cured under ultraviolet radiation with one peripheral side of the combined substrates (a liquid-crystal introduction opening) left unsealed. Thus, a one-side-open periphery sealing member 23 was formed on a peripheral portion of the combined substrates (a portion shaded by oblique lines in FIG. 23B).

In turn, a super-twisted nematic liquid crystal was introduced into a gap between the glass substrates from the liquid-crystal introduction opening as indicated by an arrow A by a vacuum filling method. The time required for the filling of the liquid crystal was two hours, which is equal to that in Example 7. Although the time required for the filling was longer than that in example 11, the alignment of liquid crystal molecules was hardly disturbed in the liquid-crystal panel because the liquid crystal was introduced from one liquid-crystal introduction opening.

EXAMPLE 13

Figure 24A:
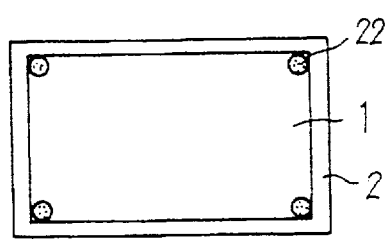
FIGS. 24A and 24B are plan views for explaining a fabrication process according to Example 13.
Figure 24B:
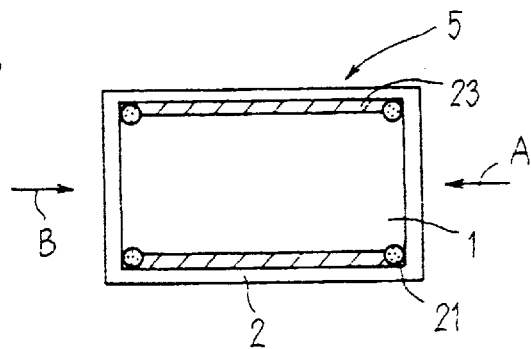

In Example 13 illustrated in FIGS. 24A and 24B, an ultraviolet-ray-curing resin was applied dropwise on two opposing peripheral sides of combined glass substrates 1 and 2 by means of a dispenser and then cured under ultraviolet radiation for the formation of periphery sealing members 23 as shown in FIG. 24A, and a super-twisted nematic liquid crystal was applied dropwise on the other two unsealed sides of the combined glass substrates 1 and 2 (liquid-crystal introduction openings) and introduced into a gap between the substrates by a vacuum filling method. These points were different from Examples 11 and 12. The time required for the filling of the liquid crystal was about one hour, which is shorter than the time required in Example 12. In this Example, although the time required for the filling was longer than that in Example 11, the alignment of liquid crystal molecules was hardly disturbed in the liquid-crystal panel because the liquid crystal was introduced from two opposing sides.

As is apparent from the foregoing examples, the thermosetting resin soft spacers scattered between the glass substrates serve as an adhesion to fix the glass substrates together and, therefore, the glass substrates are less liable to be separated from each other even if a large liquid-crystal introduction opening is formed. Further, the temporal fixing members serve to temporarily fix the substrates together until the thermosetting resin soft spacers are completely thermoset. Thus, the substrates can be fixed relative to each other without any positional offset.

The temporal fixing members may be formed in a dot (cylindrical) shape or a line (band) shape. Alternatively, dot-shaped temporal fixing members and line-shaped temporal fixing members may be used in combination.

The positions of the temporal fixing members on the substrates are not particularly limited, but the temporal fixing members are preferably formed in a peripheral portion of the substrate symmetrically with respect to the center of the substrate. Thus, a pressure can be uniformly applied onto the glass substrates when the thermosetting resin soft spacers are squashed to a thickness equivalent to the diameter of the hard spacers.

The thermosetting resin soft spacers scattered between the glass substrates have small contact area with the glass substrates for the bonding of the glass substrates. If the width of the cured temporal fixing member is less than 0.1 mm, it may be difficult to temporality fix the upper and lower glass substrates together. Therefore, the width of the cured temporal fixing member is preferably 0.1 mm to 1.0 mm.

Although four-sided glass substrates are used as the enclosure substrates of the liquid-crystal panel in the aforesaid examples, circular substrates, polygonal substrates such as triangular substrates or flexible substrates such as thin plastic plates may be used.

The soft spacers adapted to be melted or softened by heat to deform and then to cure to adhere to the glass substrates are formed of one or more thermosetting resins selected from the group consisting of phenol resins, urea resins, melamine resins, alkyd polyester resins, unsaturated polyester resins, silicon-containing resins, polyurethane resins, epoxy resins, furan resins, xylene resins, ketone-formaldehyde resins, aniline resins, sulfonamide resins, diarylphthalate resins, silicone resins and resorcin resins.

Usable as the hard spacers are hard spherical particles made of a material comprising one or more organic synthetic resins selected from the group consisting of cross-linked polystyrene polymers, cross-linked divinylbenzene polymers and amino resins, and inorganic particles of one or more kinds selected from the group consisting of chopped glass fibers, spherical silicate glass particles and alumina powder.

The hard spacers may be coated with one or more thermoplastic resins selected from the group consisting of polyvinyl chloride resins, polyvinylidene chloride resins, polyvinyl acetate resins, polymethacryl resins, polyacrylate resins, polystyrene resins, polyamide resins, polyethylene resins, polypropylene resins, fluorine-containing resins, polyacrylonitrile resins, polyvinyl ether resins, polyvinyl ketone resins, polyether resins, polycarbonate resins, chlorinated polyether resins, polyvinyl pyrrolidone resins and saturated polyester resins, which exhibit the thermoplastic property at a temperature lower than 150° C.

Usable as the liquid crystal are a twisted nematic liquid crystal, a super-twisted nematic liquid crystal, a nematic-cholesteric phase transition liquid crystal, a polymer dispersion liquid crystal, a ferroelectric liquid crystal, an antiferroelectric liquid crystal, a twist grain boundary liquid crystal and a smectic A phase liquid crystal exhibiting an electroclinic effect.

In accordance with Examples 7 to 13, the temporal fixing members exhibiting wettability permit the two substrates to be tightly fixed together when they are combined. Thus, when the upper and lower substrates are temporarily fixed together, the positional offset of the substrates can be prevented during the pressing and heating processes.

As described above, the present invention has the following advantages.

Where the present invention is applied to an optical switching device such as a liquid-crystal light modulation device or a liquid-crystal display device, the spacing between substrates in an effective display area of the device can be kept uniform and constant by employing thermally-undeformable hard spacers, thermosetting resin soft spacers and thermosetting resin periphery sealing members in combination. Therefore, the contrast ratio and response speed within the effective display area of the device can be made more uniform, so that the display quality can be improved.

The process for fabricating an optical switching device in accordance with the present invention can drastically streamline the liquid-crystal filling process which is the most time-consuming process in the fabrication process, and improve the yield, thereby reducing the production cost. Further, the fabrication process requires a reduced substrate-fixing ability of the periphery sealing members, so that the area of the periphery sealing members can be reduced. Thus, the effective display area of the device can be increased.

The fabrication process according to the present invention permits two substrates constituting an enclosure of an optical switching device to be temporarily fixed together so that the substrates are disposed facing opposite to each other and spaced a predetermined distance apart from each other without any positional offset. Further, the process can drastically streamline the liquid-crystal filling process which is the most time-consuming process in the fabrication process, and improve the yield, thereby reducing the production cost.

The invention being thus described, it will be obvious that the same may be varied in many ways. Such variations are not to be regarded as a departure from the spirit and the scope of the invention, and all such modification as would be obvious to those skilled in the art are intended to fall within the scope of the following claims.

What is claimed is:

1. An optical switching device comprising:
   at least two substrates disposed facing opposite to each other;
   hard spacers which are thermally undeformable, the hard spacers being coated with a thermoplastic resin exhibiting its thermoplastic property at a temperature not higher than 150° C.;
   soft spacers which are larger in size than the hard spacers and adapted to deform and then cure by heat to adhere to the substrates;
   the hard spacers and the soft spacers being disposed between the substrates in such a manner that a spacing between the substrates is kept constant by diameters of the hard spacers;
   a medium with an optical switching function retained in a gap defined between the substrates; and
   a sealer which seals the periphery of the gap between the substrates;
   wherein the sealer is made of a thermosetting resin having a thermosetting point equal to or higher than a thermosetting point of the soft spacers.

2. An optical switching device as set forth in claim 1, wherein the soft spacers have an average diameter less than three times the average diameter of the hard spacers.

3. An optical switching device as set forth in claim 1, wherein the soft spacers are scattered on the substrate at a scattering density of 50 to 200/mm$^2$, and the hard spacers are scattered on the substrate at a scattering density of 5 to 20/mm$^2$.

4. A. An optical switching device as set forth in claim 1, wherein the hard spacers, the soft spacers and the sealer each have a linear expansion coefficient of $10^{-4}$ to $10^{-6}$/°C.

5. An optical switching device as set forth in claim 1, wherein the sealer and the soft spacers are made of a material comprising at least one thermosetting resin having a thermosetting time of not longer than two hours at a thermosetting point of 100° C. to 160° C.

6. An optical switching device as set forth in claim 5, wherein said at least one thermosetting resin is selected from the group consisting of phenol resins, urea resins, melamine resins, alkyd polyester resins, unsaturated polyester resins, polyurethane resins, epoxy resins, furan resins, xylene resins, ketone resins, aniline resins, sulfonamide resins, diarylphthalate resins, silicone resins and resorcin resins.

7. An optical switching device as set forth in claim 1, wherein the soft spacers are formed of an epoxy resin having a thermosetting time of about one hour at a thermosetting point of about 110° C., and the sealer is formed of an epoxy resin having a thermosetting time of about one and half hours at a thermosetting point of about 150° C.

8. An optical switching device as set forth in claim 1, wherein the soft spacers are formed of a phenol resin having a thermosetting time of about one hour at a thermosetting point of about 120° C., and the sealer is formed of an epoxy resin having a thermosetting time of about one hour at a thermosetting point of about 140° C.

9. An optical switching device as set forth in claim 1, wherein the thermosetting point of the sealer is higher than the thermosetting point of the soft spacers, and said at least two substrates are heated stepwise, first at the thermosetting point of the soft spacers and then at the thermosetting point of the sealer.

10. An optical switching device as set forth in claim 1, wherein the medium retained in the gap defined between the substrates is a liquid crystal.

11. An optical switching device as set forth in claim 10, wherein the liquid crystal is selected from the group consisting of a twisted nematic liquid crystal, a supertwisted nematic liquid crystal, a nematic-cholesteric phase transition liquid crystal, a polymer dispersion liquid crystal, a ferroelectric liquid crystal, an antiferroelectric liquid crystal, a twist grain boundary liquid crystal and a smectic A phase liquid crystal exhibiting an electroclinic effect.

12. An optical switching device as set forth in claim 1, wherein the sealing of the periphery of the gap defined between the substrates is carried out in two steps in which the periphery of the gap is sealed with the sealer with at least one peripheral side thereof left unsealed before the medium with the optical switching function is filled, and the unsealed side is sealed after the filling of the medium.

13. An optical switching device as set forth in claim 1, which is a plasma display device, an electrochromic display device or a field-emission-array display device.

14. A process for fabricating an optical switching device, comprising the steps of:

scattering, on at least one of a pair of substrates for forming a liquid crystal space, hard spacers which are thermally-undeformable and soft spacers which are larger in size than the hard spacers and adapted to deform and then to cure by heat to adhere to the substrates;

heating and pressing the pair of substrates in an opposing relation to combine the substrates into a body adhered by the soft spacers and with a spacing therebetween kept constant by the hard spacers; and filling a liquid crystal between the substrates from a liquid crystal introduction opening formed on two opposing peripheral sides of the combined substrates.

15. A process as set forth in claim 14, wherein the liquid crystal to be filled between the substrates is selected from the group consisting of a twisted nematic liquid crystal, a super-twisted nematic liquid crystal, a nematic-cholesteric phase transition liquid crystal, a polymer dispersion liquid crystal, a ferroelectric liquid crystal, an antiferroelectric liquid crystal, a twist grain boundary liquid crystal and a smectic A phase liquid crystal exhibiting an electroclinic effect.

16. A process as set forth in claim 14, wherein the filling of the liquid crystal between the substrates is achieved by utilizing either or both of a pressure difference and a temperature difference between inside and outside of the combined substrates.

17. A process as set forth in claim 14, further comprising the step of sealing the periphery of the combined substrates with a sealer with a peripheral side of the combined substrates left unsealed for providing the liquid-crystal introduction opening before the filling of the liquid crystal, and the step of sealing the unsealed side with the sealer after the filling of the liquid crystal.

18. A process as set forth in claim 17, wherein the sealer is made of a thermosetting resin having a thermosetting point equal to or higher than a thermosetting point of the soft spacers.

19. A process as set forth in claim 17, further comprising the step of temporarily fixing the substrates together by providing either or both of line-shaped and dot-shaped temporal fixing members on a part of a peripheral portion of one of the substrates or on the entire peripheral portion of one of the substrates except the liquid-crystal introduction opening before the substrates are heated and pressed.

20. A process as set forth in claim 19, wherein the temporal fixing members are used as the sealer.

21. An optical switching device comprising:

at least two substrates disposed facing opposite to each other;

hard spacers which are thermally undeformable;

soft spacers which are larger in size than the hard spacers and adapted to deform and then cure by heat to adhere to the substrates;

the hard spacers and the soft spacers being disposed between the substrates in such a manner that a spacing between the substrates is kept constant by diameters of the hard spacers;

a medium with an optical switching function retained in a gap defined between the substrates; and a sealer which seals the periphery of the gap between the substrates;

wherein the sealer is made of a thermosetting resin having a thermosetting point equal to or higher than a thermosetting point of the soft spacers; and the hard spacers, the soft spacers and the sealer each have a linear position coefficient of $10^{-4}$ to $10^{-6}/°C$.

22. An optical switching device as set forth in claim 21, wherein the soft spacers have an average diameter less than three times the average diameter of the hard spacers.

23. An optical switching device as set forth in claim 21, wherein the soft spacers are scattered on the substrate at a scattering density of 50 to 200/mm$^2$, and the hard spacers are scattered on the substrate at a scattering density of 5 to 20/mm$^2$.

24. An optical switching device as set forth in claim 21, wherein the sealer and the soft spacers are made of a material comprising at least one thermosetting resin having a thermosetting time of not longer than two hours at a thermosetting point of 100° C. to 160° C.

25. An optical switching device as set forth in claim 21, wherein said at least one thermosetting resin is selected from the group consisting of phenol resins, urea resins, melamine resins, alkyd polyester resins, unsaturated polyester resins, polyurethane resins, epoxy resins, furan resins, xylene resins, ketone resins, aniline resins, sulfonamide resins, diarylphthalate resins, silicone resins and resorcin resins.

26. An optical switching device as set forth in claim 21, wherein the soft spacers are formed of an epoxy resin having a thermosetting time of about one hour at a thermosetting point of about 110° C., and the sealer is formed of an epoxy resin having a thermosetting time of about one and a half hours at a thermosetting point of about 150° C.

27. An optical switching device as set forth in claim 21, wherein the soft spacers are formed of a phenol resin having a thermosetting time of about one hour at a thermosetting point of about 120° C., and the sealer is formed of an epoxy resin having a thermosetting time of about one hour at a thermosetting point of about 140° C.

28. An optical switching device as set forth in claim 21, wherein the thermosetting point of the sealer is higher than the thermosetting point of the soft spacers, and said at least two substrates are heated stepwise, first at the thermosetting point of the soft spacers and then at the thermosetting point of the sealer.

29. An optical switching device as set forth in claim 21, wherein the medium retained in the gap defined between the substrates is a liquid crystal.

30. An optical switching device as set forth in claim 21, wherein the liquid crystal is selected from the group consisting of a twisted nematic liquid crystal, a supertwisted nematic liquid crystal, a nematic-cholesteric phase transition liquid crystal, a polymer dispersion liquid crystal, a ferroelectric liquid crystal, an antiferroelectric liquid crystal, a twist grain boundary liquid crystal and a smectic A phase liquid crystal exhibiting an electroclinic effect.

31. An optical switching device as set forth in claim 21, wherein the sealing of the periphery of the gap defined between the substrates is carried out in two steps in which the periphery of the gap is sealed with the sealer with at least one peripheral side thereof left unsealed before the medium with the optical switching function is filled, and the unsealed side is sealed after the filling of the medium.

32. An optical switching device as set forth in claim 21, which is a plasma display device, an electrochromic display device or a field-emission-array display device.

33. An optical switching device comprising:

at least two substrates disposed facing opposite to each other;

hard spacers which are thermally undeformable;

soft spacers which are larger in size than the hard spacers and adapted to deform and then cure by heat to adhere to the substrates, the soft spacers being formed of a phenol resin having a thermosetting time of about one hour at a thermosetting point of about 120° C., and the sealer is formed of an epoxy resin having a thermosetting time of about one hour at a thermosetting point of about 140° C.;

the hard spacers and the soft spacers being disposed between the substrates in such a manner that a spacing between the substrates is kept constant by diameters of the hard spacers;

a medium with an optical switching function retained in a gap defined between the substrates; and a sealer which seals the periphery of the gap between the substrates;

wherein the sealer is made of a thermosetting resin having a thermosetting point equal to or higher than a thermosetting point of the soft spacers.

34. An optical switching device comprising:

at least two substrates disposed facing opposite to each other;

hard spacers which are thermally undeformable;

soft spacers which are larger in size than the hard spacers and adapted to deform and then cure by heat to adhere to the substrates;

the hard spacers and the soft spacers being disposed between the substrates in such a manner that a spacing between the substrates is kept constant by diameters of the hard spacers;

a medium with an optical switching function retained in a gap defined between the substrates; and a sealer which seals the periphery of the gap between the substrates;

the thermosetting point of the sealer is higher than the thermosetting point of the soft spacers, and said at least two substrates are heated stepwise, first at the thermosetting point of the soft spacers and then at the thermosetting point of the sealer.

* * * * *